US007735091B2

(12) United States Patent
Aaron

(10) Patent No.: US 7,735,091 B2
(45) Date of Patent: Jun. 8, 2010

(54) METHODS, SYSTEMS AND COMPUTER PROGRAM PRODUCTS FOR PROVIDING APPLICATION SERVICES TO A USER

(75) Inventor: Jeffrey A. Aaron, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1689 days.

(21) Appl. No.: 10/924,072

(22) Filed: Aug. 23, 2004

(65) Prior Publication Data

US 2006/0041891 A1 Feb. 23, 2006

(51) Int. Cl.
*G06F 9/44* (2006.01)
*G06F 9/46* (2006.01)

(52) U.S. Cl. .................................. 719/315; 718/102

(58) Field of Classification Search .................. 719/310, 719/311, 315, 318; 718/100, 101, 102; 709/224, 709/236, 246; 705/8, 9, 26, 37; 717/126; 713/152, 164, 166; 726/1, 2, 14
See application file for complete search history.

(56) References Cited

U.S. PATENT DOCUMENTS

| | | | | | |
|---|---|---|---|---|---|
| 4,937,743 | A | * | 6/1990 | Rassman et al. | 705/8 |
| 5,615,121 | A | * | 3/1997 | Babayev et al. | 705/9 |
| 5,960,406 | A | * | 9/1999 | Rasansky et al. | 705/9 |
| 5,991,739 | A | * | 11/1999 | Cupps et al. | 705/26 |
| 6,421,730 | B1 | * | 7/2002 | Narad et al. | 709/236 |
| 6,446,141 | B1 | * | 9/2002 | Nolan et al. | 710/8 |
| 6,901,440 | B1 | * | 5/2005 | Bimm et al. | 709/223 |
| 7,107,285 | B2 | * | 9/2006 | von Kaenel et al. | 707/104.1 |
| 7,287,093 | B2 | * | 10/2007 | Lynch et al. | 709/246 |
| 7,444,414 | B2 | * | 10/2008 | Foster et al. | 709/229 |
| 7,503,061 | B2 | * | 3/2009 | Foster et al. | 726/2 |
| 7,607,132 | B2 | * | 10/2009 | Liu | 718/102 |
| 2002/0016729 | A1 | * | 2/2002 | Breitenbach et al. | 705/9 |
| 2002/0066033 | A1 | * | 5/2002 | Dobbins et al. | 713/201 |
| 2003/0033234 | A1 | * | 2/2003 | RuDusky | 705/37 |
| 2003/0033345 | A1 | * | 2/2003 | Keefer et al. | 709/102 |
| 2003/0055769 | A1 | * | 3/2003 | RuDusky | 705/37 |
| 2003/0066057 | A1 | * | 4/2003 | RuDusky | 717/140 |
| 2004/0205766 | A1 | * | 10/2004 | Lee et al. | 719/311 |
| 2005/0071843 | A1 | * | 3/2005 | Guo et al. | 718/101 |
| 2005/0207439 | A1 | * | 9/2005 | Iyengar et al. | 370/428 |
| 2009/0031312 | A1 | * | 1/2009 | Mausolf et al. | 718/102 |

OTHER PUBLICATIONS

"Heterogeneous Sensor Networks", Intel Technology Journal, 2003. (website: www.intel.com/research/exploratory/hetergenoeous/.htm).
Butler, Jim, "Mobile robots as gateways into wireless sensor networks", LinuxDevices.com, May 2, 2003.
Green, Heather, "Tech Wave 2: The Sensor Revolution", BusinessWeek Online, Aug. 25, 2003.

* cited by examiner

*Primary Examiner*—Van H Nguyen
(74) *Attorney, Agent, or Firm*—Myers Bigel Sibley & Sajovec

(57) ABSTRACT

Computing device executed application services are provided to a user using a plurality of application service providing modules, each of which provides a subset of the application services to the user. A request received form the user is translated to one or more needs to be satisfied. One or more of the application service providing modules required for satisfying the need(s) is identified. Execution of actions by the identified application service providing module(s) to satisfy the need(s) is scheduled.

28 Claims, 7 Drawing Sheets

METHODS, SYSTEMS AND COMPUTER PROGRAM PRODUCTS FOR PROVIDING APPLICATION SERVICES TO A USER

FIELD OF THE INVENTION

This invention relates to computing devices, and more particularly to such devices supporting a variety of different applications.

BACKGROUND OF THE INVENTION

Computing devices are used for providing a wide variety of applications support to users. As used herein, the term "computing device" refers to any equipment with computational capability or that is integrated with equipment with computational ability. Accordingly, as used herein, computing device can include one or more enterprise, application, personal, pervasive and/or embedded computer systems that perform computational operations and associated input and/or output devices or components thereof. Examples of computing devices, as used herein, include computer workstations, personal digital assistants, cell phones, email pagers, automobile navigation systems, and computer-controlled appliances.

As computing devices and application programs for the same evolve, along with networks interconnecting such devices, the range of customer services that can be provided by computing devices is becoming increasingly complex. As a result, some customers are experiencing problems in assimilating and utilizing these computing device based application services. As a result, despite the range of available services, service functionality is generally self-limited and self-defeating and different types of application services are generally developed separately, often with only an operating system, such as the Windows operating system from Microsoft Corporation, in common. While such an operating system may provide an integrated framework allowing application programs to access hardware of a computing device, no integrating framework at an application level is provided, even though technology is becoming available which may be used to enable such a framework (e.g., Web Services and Liberty Alliance using extensible markup language (XML) over Simple Object Access Profile (SOAP) over hypertext transport protocol (HTTP) over Internet protocol (IP)).

Re-usable components for application services programs are very limited, for example, to small pieces like code objects, a few types of standard "servers" such as Remote Authentication Dial-In User Service (RADIUS) and, a small number of standard "functions" such as authentication. As a result, such service offerings generally cannot build on each other and no model or method is available to facilitate needed interactions. Even "bundled" services, such as Office available from Microsoft Corporation, are hardly integrated in functionality, even though they may achieve data interchange compatibility. As such, service complexity generally rises too fast for customers/users as features are added, thereby reducing ease-of-use and ultimate value to the user of such application services. In addition, architectural complexity may rise too fast for conceptual designers & developers as features are added, such that increasing errors and development time and cost may result. Furthermore, security is typically piecemeal, separate, incomplete, insufficient and/or too hard to use.

SUMMARY OF THE INVENTION

In some embodiments of the present invention, computing device executed application services are provided to a user using a plurality of application service providing modules, each of which provides a subset of the application services to the user. A request received from the user is translated to one or more needs to be satisfied. One or more of the application service providing modules required for satisfying the need(s) is identified. Execution of actions by the identified application service providing module(s) to satisfy the need(s) is scheduled, and in some embodiments is monitored.

In other embodiments of the present invention, systems for providing computing device executed application services to a user include a plurality of service providing component modules, each of which provides a subset of the application services to the user. A coordination module is provided that is configured to translate requests from a user to needs and to schedule execution of actions by ones of the plurality of service providing component modules to satisfy the needs.

In further embodiments of the present invention, systems for providing computing device executed application services to a user include a plurality of personality profiles. A service providing component module is configured to incorporate a selected one of the plurality of personality profiles to provide an interface to the user having characteristics defined by the selected one of the personality profiles.

In other embodiments of the present invention, systems for providing computing device executed application services to a user include a plurality of service providing component modules, each of which provides a subset of the application services to the user. The respective subsets of the application services are grouped based on an anthropomorphic model of non-computing device based providers of corresponding application services. An interface module communicatively couples the plurality of service providing modules.

In yet further embodiments of the present invention, methods for providing computing device executed application services to a user using a plurality of application service providing modules, each of which provides a subset of the application services to the user, include communicating an integrated security model for the provision of application services to the plurality of application service providing modules to define an integrated security model. Operations of the plurality of service providing modules are controlled based on the integrated security model.

In other embodiments of the present invention, systems for providing computing device executed application services to a user include a plurality of service providing component modules, each of which provides a subset of the application services to the user. A security control module is provided that is configured to communicate with the plurality of service providing component modules and the interface module to define an integrated security model for the system to control operations of the plurality of service providing modules based on the integrated security model. Interface modules may be provided that are configured to communicatively couple the plurality of service providing modules and filter communications between the plurality of application service providing modules based on the integrated security model. The security control module may be configured to communicate with the interface modules to define the integrated security model. In some embodiments, so called-infrastructure modules may be included to provide various maintenance & support functions which aid the providing of services to the user and/or the providing of security features.

DETAILED DESCRIPTION

Figure 1:
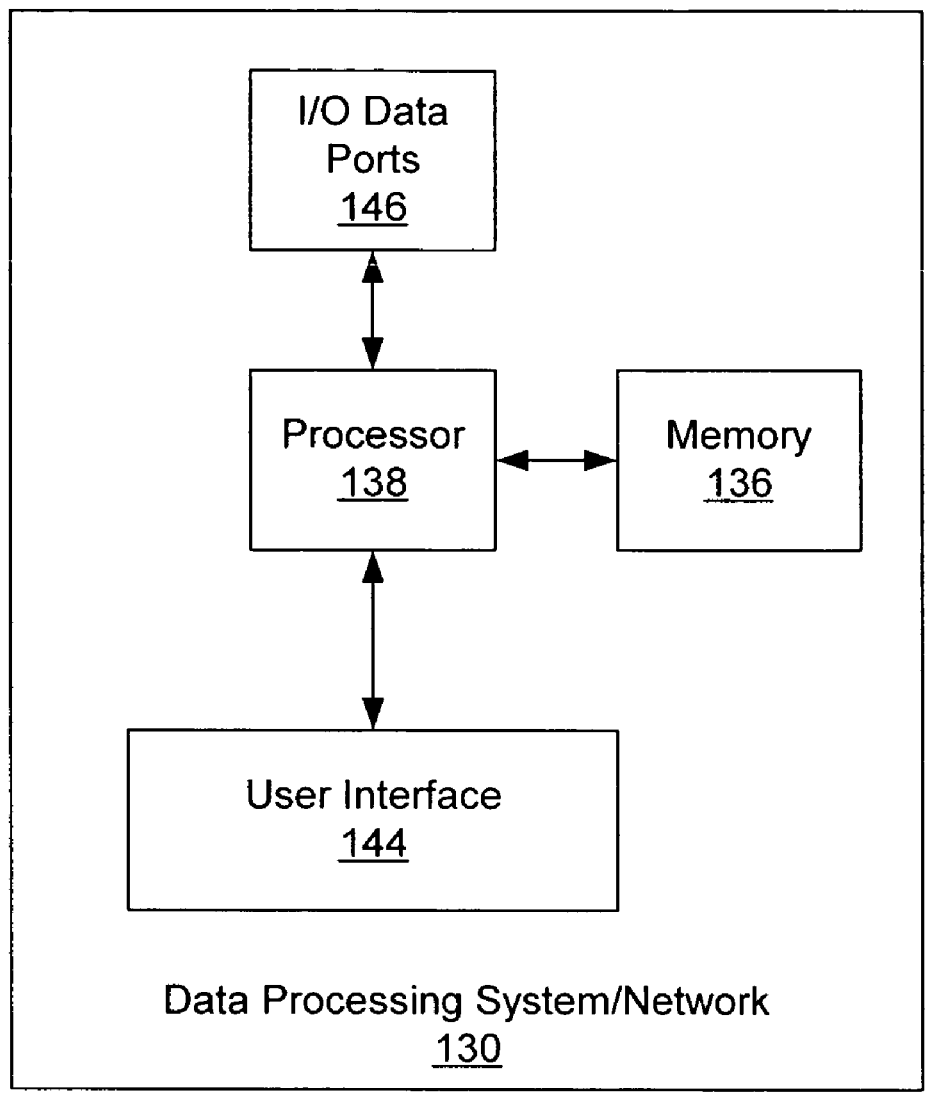
FIG. 1 of a data processing system suitable for use in some embodiments of the present invention.

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the term "and/or" includes any and all combinations of one or more of the associated listed items.

The present invention is described below with reference to block diagrams and/or flowchart illustrations of methods, apparatus (systems) and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Finally, it will be understood that, although the terms first, second, etc. may be used herein to describe various elements, these elements should not be limited by these terms. These terms are only used to distinguish one element from another. For example, a first portion could be termed a second portion, and, similarly, a second portion could be termed a first portion without departing from the teachings of the disclosure.

FIG. 1 illustrates an exemplary embodiment of a computing device or data processing system 130 configured in accordance with embodiments of the present invention. The data processing system 130, which may be incorporated in, for example, a personal computer, a PDA, a wireless terminal/phone, a smart appliance or the like, may include a user interface 144, including, for example, input device(s) such as a keyboard or keypad, a display, a speaker and/or microphone, and a memory 136 that communicate with a processor 138. The data processing system 130 may further include an I/O data port(s) 146 that also communicates with the processor 138. The I/O data ports 146 can be used to transfer information between the data processing system 130 and another computer system or a network using, for example, an Internet protocol (IP) connection. These components may be conventional components such as those used in many conventional data processing systems, which may be configured to operate as described herein.

Figure 2:
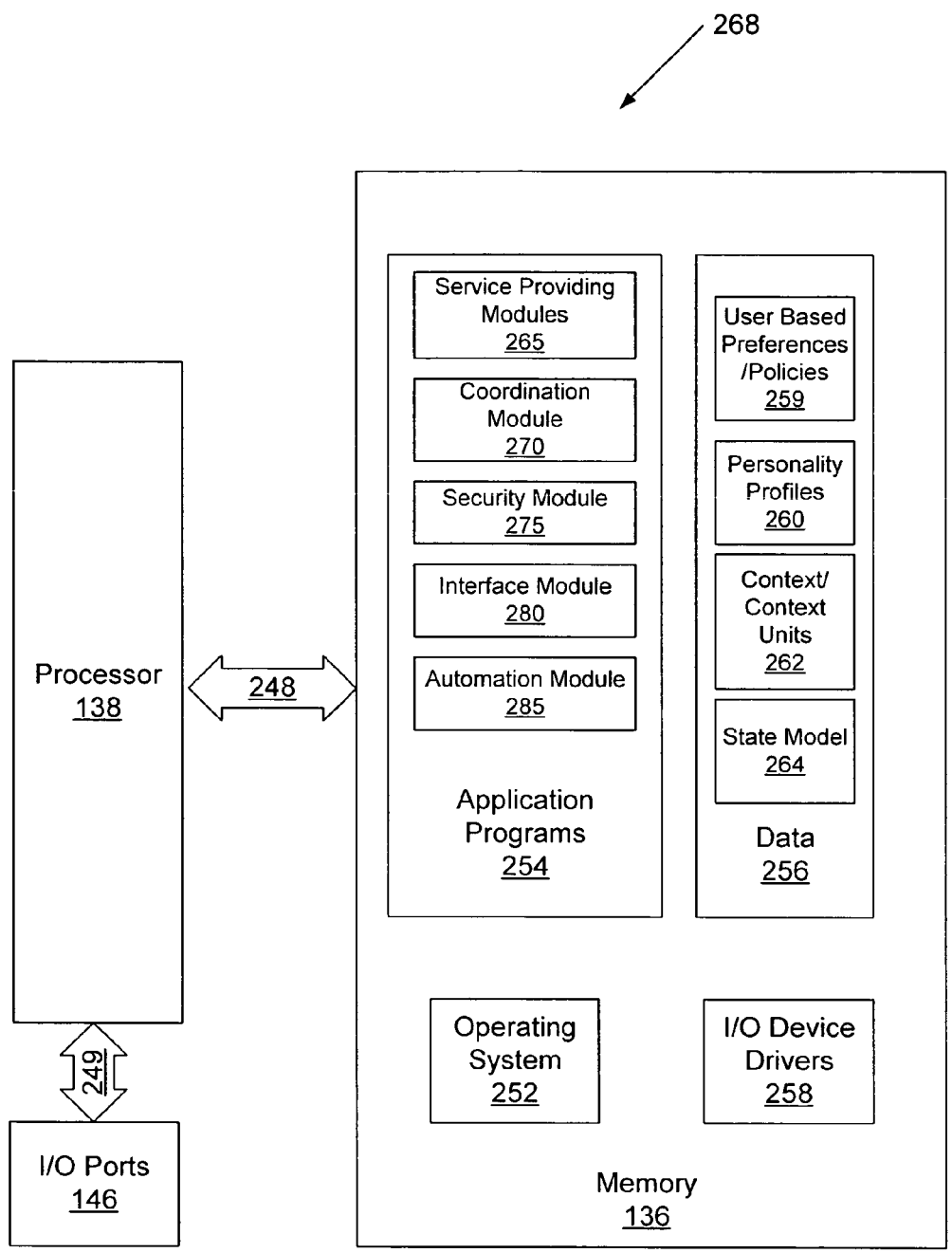
FIG. 2 is a block diagram of a system for providing application services to a user according to some embodiments of the present invention.

Referring now to FIG. 2, a block diagram of a system 268 for providing computing device executed application services to a user is provided that illustrates systems, methods, and computer program products in accordance with embodiments of the present invention as will now be discussed. The processor 138 communicates with the memory 136 via an address/data bus 248. The processor 138 can be any commercially available or custom microprocessor, microcontroller, digital signal processor or the like. The memory 136 may include any memory devices containing the software and data used to implement the functionality of the data processing system 130. The memory 136 can include, but is not limited to, the following types of devices: ROM, PROM, EPROM, EEPROM, flash memory, SRAM, and DRAM.

As shown in FIG. 2, the memory 136 may include several categories of software and data used in the system 268: an operating system 252; application programs 254; input/output (I/O) device drivers 258; and data 256. As will be appreciated by those of skill in the art, the operating system 252 may be any operating system suitable for use with a data processing system, such as OS/2, AIX or zOS from International Business Machines Corporation, Armonk, N.Y., Windows95, Windows98, Windows2000 or WindowsXP from Microsoft Corporation, Redmond, Wash., Cisco IOS, VxWorks, Unix or Linux. The I/O device drivers 258 typically include software routines accessed through the operating system 252 by the application programs 254 to communicate with devices such as the I/O data port(s) 146 and certain memory 136 components. The application programs 254 are illustrative of the programs that implement the various features of the communications circuit 268 and preferably include at least one application that supports operations according to embodiments of the present invention. Finally, the data 256 represents the static and dynamic data used by the application programs 254, the operating system 252, the I/O device drivers 258, and other software programs that may reside in the memory 136.

As further illustrated in FIG. 2, according to some embodiments of the present invention the application programs 254 include application service providing modules 265 and a coordination module 270. In addition, a security module 275, an interface module(s) 280 and/or an automation module 285 may be provided. Other embodiments of the present invention include the service providing modules 265 and the security module 275 and optionally other of the modules. The service providing modules 265 are application service providing modules, each of which provides a subset of the application services to a user supported by the system 268 for providing computing device executed application services to a user. In some embodiments of the present invention, the coordination module 270 is configured to translate requests from a user to need(s) and to schedule execution of actions by ones of the plurality of application service providing modules 265 to satisfy the need(s). The security module 275 may be configured to receive security context information from ones of the plurality of applications service providing modules 265, define a security level global context based on the received security context information and communicate the security level global context to the plurality of application service providing modules 265. The interface module(s) 280 in some embodiments of the present invention are not visible to the user, whereas the application service providing modules 265 may be visible. The interface module(s) 280 may communicatively couple the application service providing modules 265 to each other and dynamically restrict communications in-progress between the application service providing modules 265. The automation module 285 may be configured to receive information regarding user requests and needs and predict future needs for the user and possible actions based on processing rules for the user.

In other embodiments of the present invention, the data 256 includes one or more personality profiles 260. One or more of the application service providing modules 265 is configured to incorporate a selected one of the plurality of personality profiles 260 to provide an interface to a user having characteristics defined by the selected one of the personality profiles 260.

In yet other embodiments of the present invention, one or more of the application service providing modules 265 is provided a respective subset of the application services to be provided to the user that is grouped based on an anthropomorphic model of non-computing device based providers of corresponding application services. In other words, the grouping of services supported by a particular application service providing module may be modeled in a manner where the grouping of services for a particular module are based on human counterpart service providers rather than a programming model or the like. The anthropomorphic model subsets of each application service providing module may then be communicatively coupled by the interface module(s) 280.

The various system configurations described above may generally be categorized as directed to the coordination and delivery of services to a user. Other embodiments of the present invention are directed to security aspects of providing services to a user. In such embodiments, the security control module 275 may be configured to communicate with the application service providing modules 265 to define an integrated security model for the system to control operations of the application service providing modules 265 based on the integrated security model. In such embodiments, the interface module(s) 280 may be configured to communicatively couple the application service providing modules 265 and filter communications between the application service providing modules 265 based on the integrated security model. The security control module 275 may be configured to communicate with the interface module(s) 280 to define the integrated security model. Thus, in various embodiments of the present invention, the integrated security model may be utilized to control both the sending of messages by the application service providing modules 265 and to control filtering out of messages to and from the application service providing modules 265 at the interface module(s) 280. In some embodiments, the integrated security model may also be used to control re-assignment of tasks or services from one or a group of application service providers to another one or group of same, and this may be effected by the interface module(s) and/or security-related modules, for instance the security control module.

Additional aspects of the data 256 in accordance with embodiments of the present invention are illustrated in FIG. 2. As illustrated in FIG. 2, the data 256 may include user based preferences/policies 259, the personality profiles 260, dynamic context (including context unit) information 262 and/or state machine model(s) 264. The user based preferences/policies 259 may be used to change operations for providing computing device executed application services to a user based on particular characteristics or desires of the respective user as will be further described with reference to the flow charts below.

As discussed above, the personality profiles 260 may be used to provide a selectable personality for an application service providing module 265 for all and/or selected users. The dynamic context information 262 provides a dynamic context database accessible to the various application programs 254 that, as will be described further with reference to the flow charts below, may be used to modify operations and delivery of application services responsive to the dynamic context of various components of the system. The interlocked state machine model(s) 264 will also be described below for various embodiments where they may be used to control operations and application service providing so as to provide enhanced security and control opportunities. As used herein "interlocked" state machine model(s) refers to the interrelationship between models for respective nodes or application service providing modules and/or the flows related to communications between those nodes as seen, for example, at interface module(s) between the nodes in carrying out user need fulfillment operations or other operations, as for example various overhead operations needed to maintain or enable basic functioning.

While the present invention is illustrated with reference to the various modules 265, 270, 275, 280, 285 being application programs in FIG. 2, as will be appreciated by those of skill in the art, other configurations fall within the scope of the present invention. For example, rather than being an application program, the interface module 280 may also be incorporated into the operating system 252 or other such logical division of the data processing system 130. Furthermore, while the various application programs 254 are illustrated in a single data processing system, as will be appreciated by those of skill in the art, such functionality may be distributed across one or more data processing systems. For example, the security module 275 may be resident on a distinct device from the application service providing modules 265, and various application service providing modules 265 may be resident on different devices, and distinct instantiations of the same application service providing module may be resident on different devices. Thus, the present invention should not be construed as limited to the configuration illustrated in FIGS. 1 through 2, but may be provided by other arrangements and/or divisions of function between data processing systems. In fact, as will be clear from the description herein, the functionalities of the present invention will typically be distributed across a network of communicatively coupled computing devices and may utilize a variety of input/output devices to provide application services to users.

Figure 3:
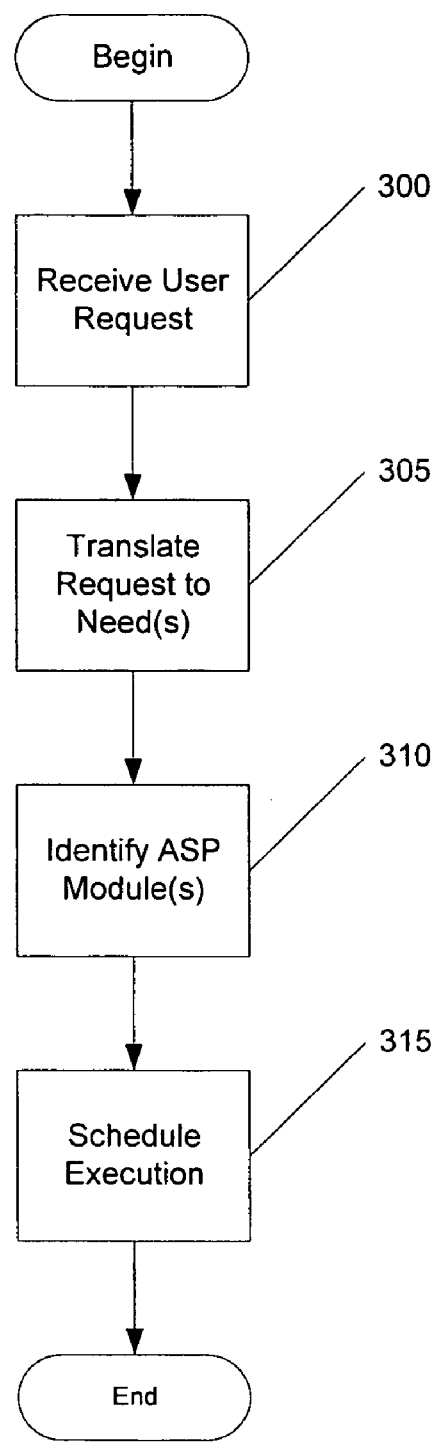
FIGS. 3-7 are flowcharts of operations that may be performed according to various embodiments of the present invention.

Operations according to various embodiments of the present invention will now be further described with reference to the flow chart illustrations of FIGS. 3 through 7. Referring first to FIG. 3, methods for providing computing devices executed application services to a user using a plurality of application service providing modules, each of which provides a subset of application service to the user, will now be described for various embodiments of the present invention. Operations begin at Block 300 by receiving a request from the user. The request from the user is translated to at least one need to be satisfied (Block 305). One or more of the application service providing (ASP) modules used to satisfy the need(s) is identified (Block 310). The execution of actions by the identified application service providing module(s) to satisfy the need(s) are then scheduled (Block 315). As noted with reference to FIG. 2 above, a plurality of user based preference/policies 259 may be provided. Operations at Block 305 may include identifying one of the plurality of user based preferences policies associated with the requesting user and translating the request from the user to need(s) based on the identified user based preference/policy. Furthermore, operations at Block 315 may include scheduling execution of actions based on the identified user based preference/policy.

Further embodiments of the present invention for providing computing device executed application services to a user will now be described with reference to the flowchart illustration of FIG. 4. Operations begin at Block 400 by selecting a personality profile for one or more of the application service providing modules for a requesting user. As noted above, the selected personality profile may be incorporated into an application service providing module that is configured to incorporate the personality profile to provide an interface to a requesting user having characteristics defined by the selected personality profile. It will further be understood that the initial selection of personality profiles and configuration of the application service providing modules may be triggered responsive to initial receipt of a request from the user and maintained for future use or may be established responsive to each request as received. In any event, a request is received from a user (Block 405).

Figure 4:
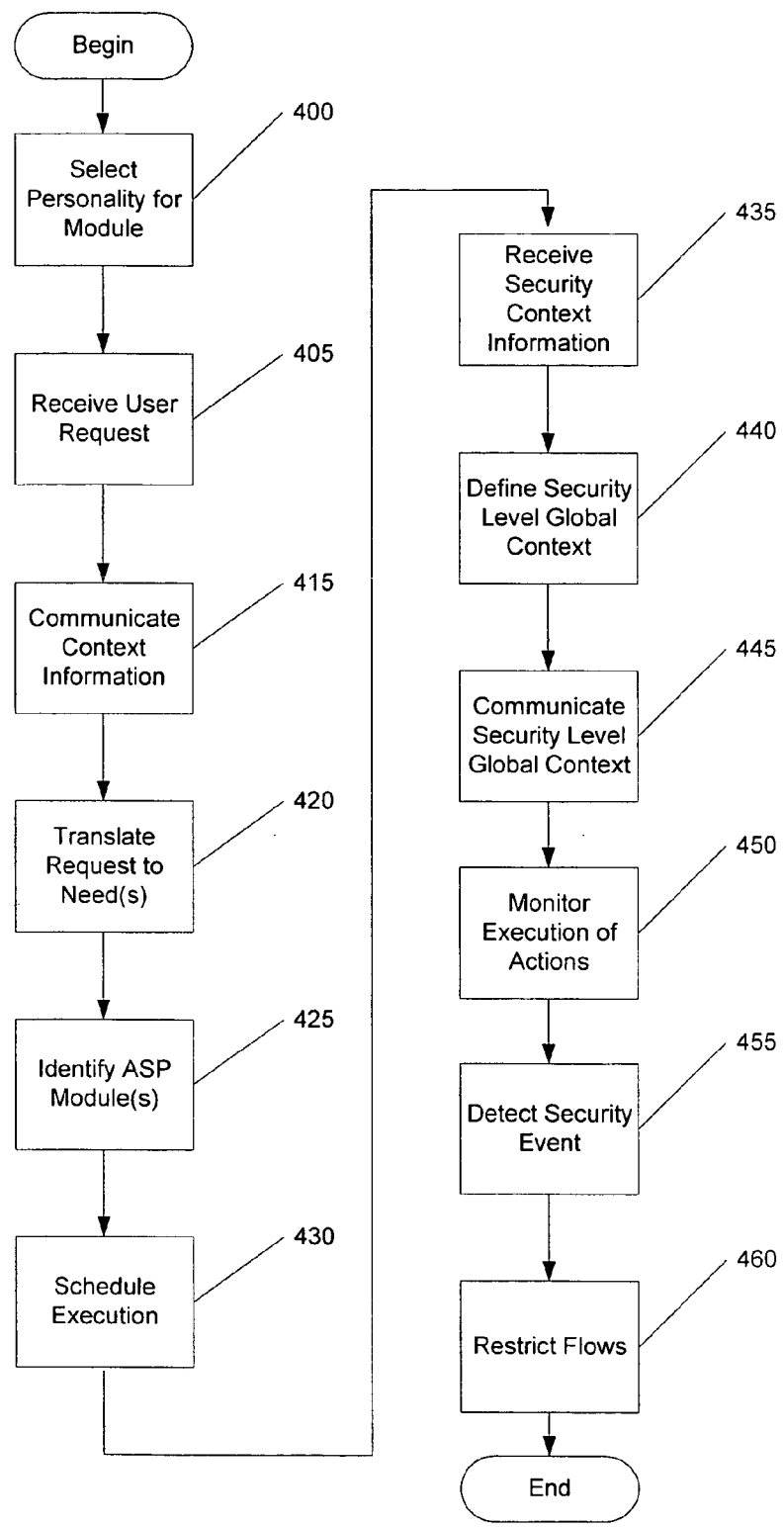

For the particular embodiments shown in FIG. 4, the application service providing modules are each associated with a dynamic context. The dynamic context for an application service providing module is dependent on a condition of another of the application service providing modules that is not determinable merely based on communications resulting from execution of actions to provide services to a user. This dynamic context information may be used for a variety of reasons within the framework of service providing operations and, as shown at Block 415, the dynamic context information may be communicated between ones of the application service providing modules to advise the respective application service providing modules of dynamic context information related to other of the application service providing modules. The dynamic context information so communicated may also impact on how and what actions are scheduled as will be described with reference to Block 430 below.

As will be further described later herein with reference to different examples, the use of dynamic context of the present invention in some embodiments includes a high level context and a low level context. The high level context may include a global context that is applicable to all of the plurality of application service providing modules. The low level context is generally applicable to an individual application service providing module, providing information unique to that module. In addition, ones of the application service providing modules may be associated with one or more groups for carrying out different needs based on user requests. The dynamic contexts may also include an intermediate level context corresponding to these groups. As such, the dynamic contexts for a particular application service providing module may include an intermediate level context based on any groups with which the particular application service module is associated as any particular module may be associated with different groups for fulfillment of different needs. The dynamic context in some embodiments of the present invention for at least one of the context levels includes both an operational context associated with conditions related to performance of the application service providing modules and a security context associated with security threats to providing the computing device executed application services to the user, or with threats to providing required overhead maintenance/support functionality.

An application service providing module may maintain its dynamic context as a master context record including a plurality of context units. When communicating dynamic context information at Block 415, in some instances, only selected ones of the contexts units may be communicated so as to limit or minimize the amount of information that need be communicated between application service providing modules. As will be further described later herein with reference to particular examples, the master context may have a predefined ordering of context units and the master context for a particular application service providing module may include only a subset of all possible context units, which may be maintained in an ordered sequence corresponding to an archetypal master context including all possible context units. Thus, an orderly relationship may be provided allowing selected context units to be omitted while staying consistent with the archetypal context ordering. Example context units include security alert level, latency, error condition, execution hold conditions, trust level and/or security attack in progress indications. A particular context unit may be provided as a plurality of context units, each of which is associated with a different context level (such as high, intermediate, or low).

A received request from a user is translated to one or more need(s) to be satisfied (Block 420). One or more of the application service providing modules required for satisfying the need(s) is identified (Block 425). Execution of actions by the identified application service providing module to satisfy the need(s) is then scheduled, optionally based on dynamic context information (Block 430).

For the embodiments illustrated in FIG. 4, the system includes a security or security control module communicatively coupled to the application service providing modules and/or interface module(s). Security context information is received at the security module from ones of the application service providing modules (Block 435), and in some embodiments also from interface modules and/or other so-called infrastructure modules described later herein. The security module defines a security level global context based on the received security context information (Block 440). The security level global context is communicated from the security module to the application service providing modules (Block 445), and in some embodiments also from interface modules and/or other so-called infrastructure modules described later herein.

Using dynamic context and or other security information, execution of actions by the application service providing modules and/or infrastructure modules is monitored (Block 450). The execution of actions may be monitored both at the application service providing modules/infrastructure modules and the interface modules that process communications between the application service providing modules/infrastructure modules. As will be more fully described later herein, execution may be monitored by defining an interlock state machine model(s) for the application service providing modules for different needs to be satisfied, as well as infrastructure modules for different functions to be provided, and monitoring execution based on the state machine model(s) to detect deviations from expected state transitions or communications between modules not consistent with expected communications based on the interlock state machine model(s). A security event may be detected based on the monitored execution of the actions or functions (Block 455). Communication flows between application service providing modules may be dynamically restricted in-progress between ones of the application service providing modules based on the detected security event (Block 460), and likewise between infrastructure modules, and likewise between application service providing modules and infrastructure modules.

As has been briefly discussed above, the application service providing modules may be visible to the user and various interface modules and other modules associated with various embodiments of the present invention may be invisible or infrastructure modules. A particular breakdown of interaction between such invisible infrastructure modules for some embodiments will be fully described later herein. However, by way of initial example, scheduling execution of actions at Block 430 in some embodiments of the present invention includes generating a needs list using a composer module not visible to the user and identifying the actions to be executed based on the generated needs list and communicating ones of the identified actions to associated ones of the application service providing modules for execution using a conductor module, which is also not visible to the user. The identified actions may be defined as baseline actions with modification actions designated by the conductor module that modify the actions to be executed by the application service providing modules. The receiving application service providing modules may further expand received ones of the communicated identified actions into transactions executable by the receiving application service providing module. The application service providing module may then execute the transactions to fulfill the need(s).

Referring again to FIG. 2, it was noted that some embodiments of the present invention include an automation module 285. The automation module may be configured to receive information regarding user requests and needs and to predict future needs for the user based on processing rules for the user. The automation module 285 may subsequently receive a potential needs trigger (such as an event that could trigger invocation of a need, depending on some other condition) notification from an application service providing module and compare the received potential needs trigger to the predicted future needs. Execution of the predicted future needs may be scheduled by the automation module 285 when they correspond to the received potential trigger. The scheduled execution may be made contingent on obtaining a request from the user authorizing execution of the predicted future needs or may be executed without depending on future additional confirming input from the user, in some embodiments depending on the user's preferences/policies.

Figure 5:
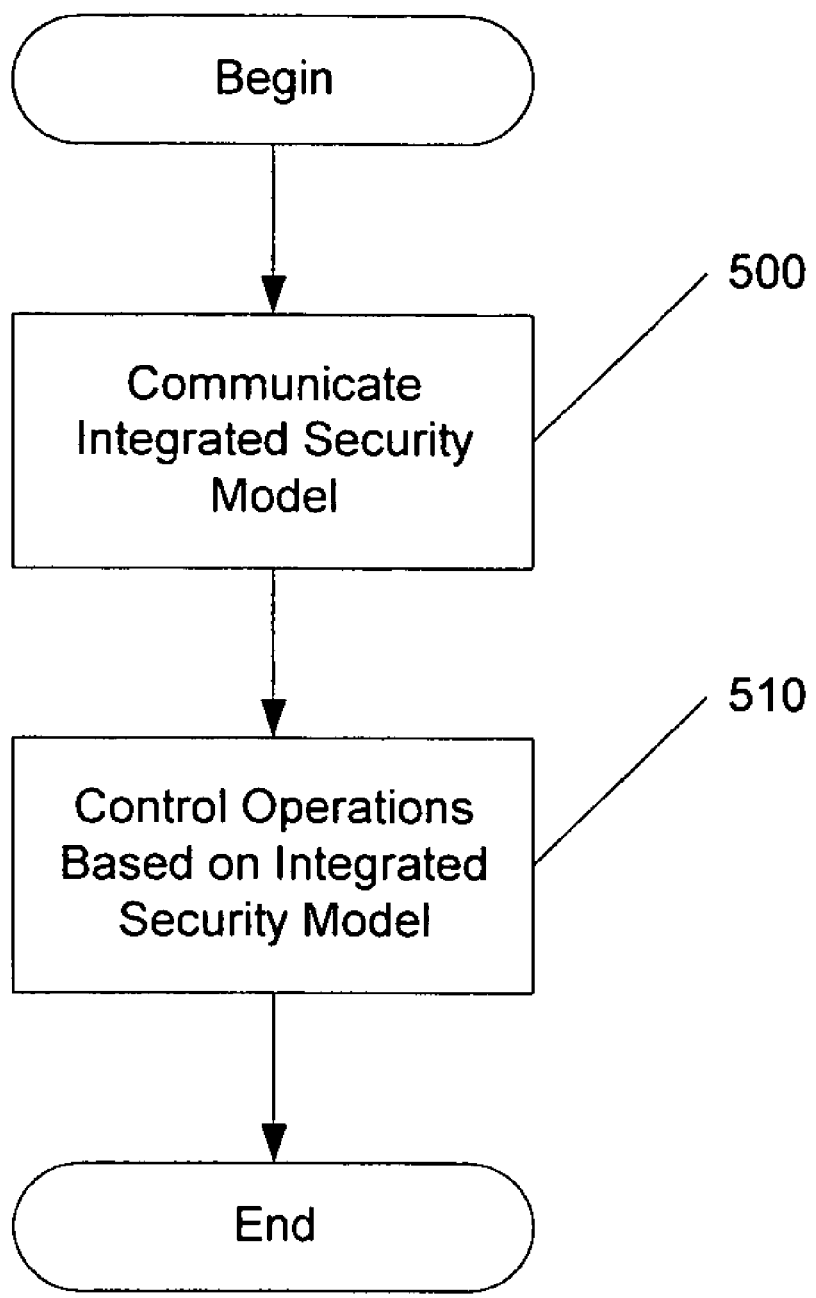

Further embodiments of methods for providing computing device executed application services to a user using a plurality of application service providing modules will now be described with reference to the flow chart illustration of FIG. 5. Operations begin at Block 500 by communicating an integrated security model for the provision of application services to the plurality of application service providing modules to define an integrated security model (Block 500). As used herein, an "integrated security model" is an application software level model extending across a plurality of application service providing modules as distinguished from lower level security constraints provided, for example, by the underlying operating system or its components which are shared in common by all of the application service providing modules intrinsically through the use of the common underlying operating system for various actions. This operating system characteristic is distinct from the application level security provided by an "integrated security model" extending across the different application service providing modules and controlling their interactions independent of the underlying operating system. Note that the integrated security model can, in some embodiments, extend across and be communicated also to the interface modules and infrastructure modules.

Referring again to FIG. 5, operations of the application service providing modules are controlled based on the integrated security model (Block 510). In particular embodiments of the present invention, the application service providing modules are communicatively coupled by interface modules and the integrated security model is also communicated to the interface modules. Operations at Block 510 related to controlling operations in such embodiments may include filtering communications between the application service providing modules at the interface modules based on the communicated integrated security model.

Figure 6:
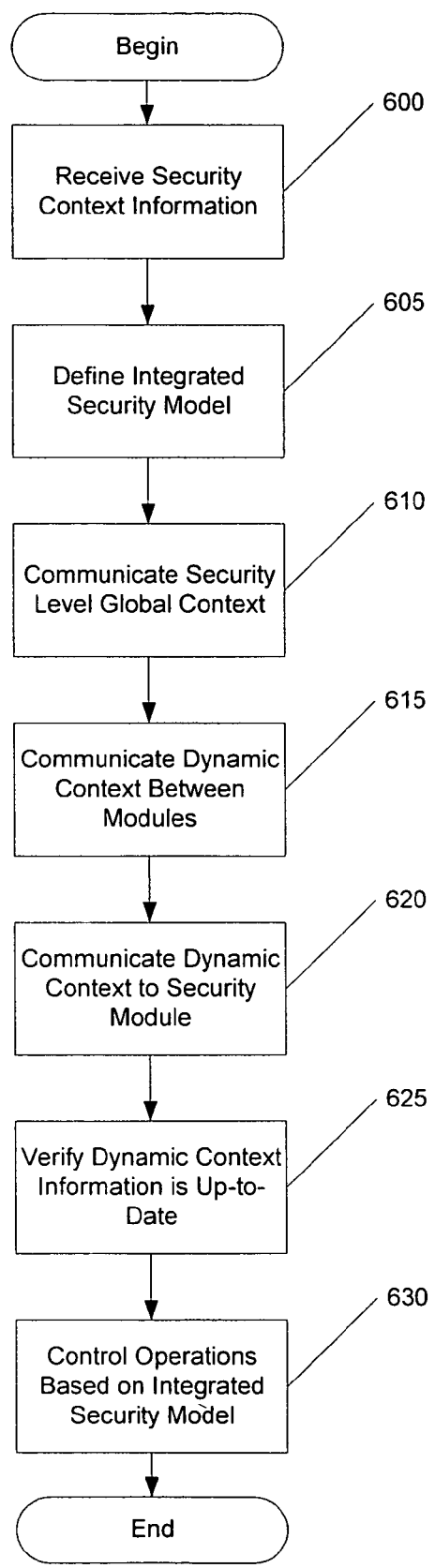

Further embodiments of the present invention for providing computing device executed application services related to security will now be described with reference to the flowchart illustration of FIG. 6. Operations begin at Block 600 by receiving, at a security module communicatively coupled to the application service providing modules, security context information from ones of the application service providing modules and/or from other modules. An integrated security model is defined based on the received security context information (Block 605). In particular, the integrated security model may include a security level global context applicable to all of the application service providing modules, as well as other modules in some embodiments. The integrated security model including the security level global context is communicated to the application service providing modules (Block 610), as well as other modules in some embodiments.

As discussed above, a dynamic context may be associated with the application service providing module. The "dynamic context" for an application service providing module, as that term is used herein, is dependent on a condition of another of the application service providing modules, or other modules such as infrastructure modules, that is not determinable based only on communications from the application service providing modules, or other modules, resulting from execution of application service related actions, or the actions of other modules. In other words, the dynamic context as used herein provides information related to an operational condition or security state of others of the application service providing modules, or other modules, that is not determinable merely from transaction communications generated during execution of actions to fulfill needs by the application service providing modules, or by the various functions/actions of the other modules. For implementation efficiency and convenience, this definition may be relaxed somewhat, in that the test of "not determinable" could be replaced with "not easily determinable." Thus, the dynamic context could involve a variety of different types of information, which will be more fully described later herein both regarding security and operational issues. The integrated security model defined at Blocks 605 may be determined based not only on received security information but other dynamic context information from various of the application service providing modules, or other modules. In particular, the dynamic context and security related aspects of some embodiments of the present invention includes a security context associated with security threats to providing computing device executed application services to the user, or to providing maintenance & support functions indirectly affecting the user, for at least one context level (such as global, intermediate or low level).

Referring again to FIG. 6, dynamic context information may be periodically communicated to the security module (Block 620). Using this periodically communicated dynamic context information, the security module may verify that the communicated dynamic context information from the application service providing modules, or other modules, is up to date (Block 625). Operations of the application service providing modules, and other modules in some embodiments, are controlled based on the integrated security model (Block 630).

Figure 7:
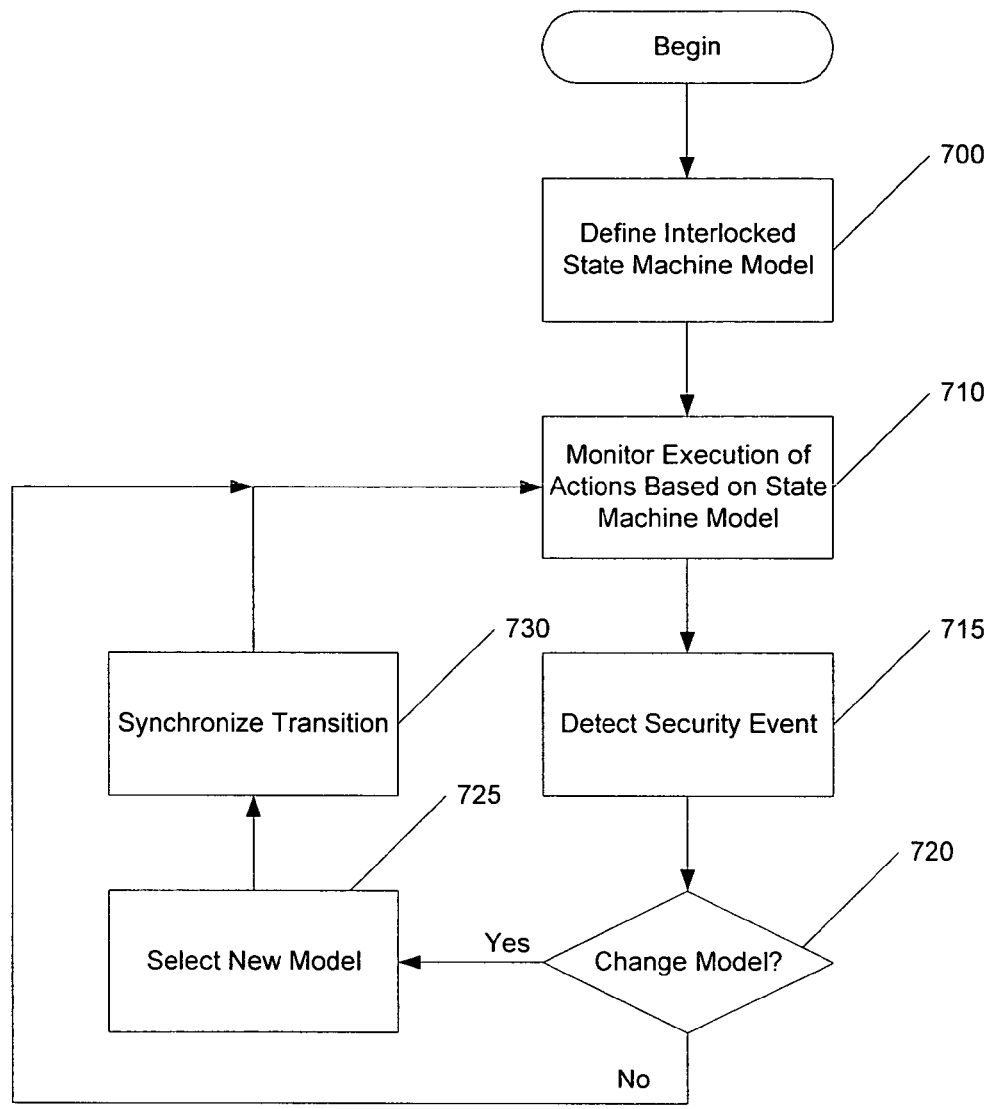

Some embodiments of the present invention utilizing interlocked state machine models will now be further described with reference to the flowchart illustration of FIG. 7. As shown in FIG. 7, operations begin at Block 700 with defining an interlocked state machine model for the plurality of application service providing modules for an application service to be provided to a user. It will be understood that the interlock state machine model may include a plurality of underlying more detailed models related to different aspects of need processing and distinct models may be provided associated with processing of different needs by different application service providing modules. It will also be understood that the models for any individual application service providing module for satisfaction of a particular need will generally be distinct from the corresponding model at other modules and/or a corresponding transaction model for use by interface modules in monitoring and controlling operations. Note that in some embodiments, the interlocked state machine model may also include other modules such as infrastructure modules, and their operations and actions.

Execution of actions related to providing the application service to the user by the application service providing modules, and/or execution of actions by infrastructure modules, is monitored based on the interlocked state machine model (Block 710). A security event may be detected based on the monitored execution of the actions (Block 715). The interlocked state machine model may be defined, or modified or changed to another model, at Block 700 based on a security event detected at Block 715. Monitoring execution of actions at Block 710 may include dynamically restricting communications in-progress between ones of the application service providing modules based on the detected security event. In some embodiments, this is accomplished by the use of interface modules not visible to the user, which restrict communications in-progress based on the interlocked state machine model, for example, blocking passage of communications that are inconsistent with the applicable interlock state machine model for expected transactions at the interface module. Such communication attempts may be blocked and further may be detected as a security event. In some embodiments, the portion of a state model related to just one or just a group of modules may be modified or changed based on a security event, and this may be accomplished via communicated commands and synchronization as will be described below, from the interface modules and/or security control module.

Aspects of further embodiments of the present invention related to the use of interlocked state machine models will now be described with reference to FIG. 7 related to changing of such models, for instance in a pre-defined but randomly-appearing manner so as to confuse and fool would be hackers who might attempt to discover and exploit static state models. In such embodiments, a plurality of alternative interlocked state machine models are defined at Block 700, which may be sequentially selected as an active interlocked state machine model. As such, it is determined at Block 720 if it is time to change to an alternative one of the interlocked state machine models. If so, a new model is selected as an active model. The transition of the application service providing modules, and/or other modules, to the new active model is synchronized (Block 730) so that their operations can be safely changed to correspond to the new state model without inadvertent loss of any important functional actions. Operations may then return to monitoring executions based on the new model at Block 710. Otherwise (Block 720), execution of actions continues to be monitored based on the previous model. Note that a new model may result in changes to all or just some of the modules, and if limited to just some of the modules, then communication of the new model and subsequent synchronization may likewise be limited.

As will now be further described, various embodiments of the present invention may provide an application framework, sometimes referred to herein as Automated Service-Providing Integrated Commonality (ASPIC) that may enable a variety of application services to be provided to customers/users. This framework may provide a top-level "Complete Simplification" (CS) service to which the customer/user may relate, although the framework could be utilized to provide a limited subset of this, or to provide only selected pieces of it. The framework may include a set of interrelating functional components and can also utilize a specific interaction model that may provide increased security and reliability. The components, some of which the customer/user may directly relate to in terms of "sub-services" visible to the user, may form logical building blocks as well as enabling service capabilities (both individually and by their association). The interaction model may be used to guide and constrain the actions of the framework components to provide increased/integrated prediction, proactive working, security, reliability, and functional verification. The components and service functions in some embodiments may incorporate anthropomorphic characteristics to enhance usability and ease of development for the user via easily recognized analogies to human providers of corresponding services. The framework may be inherently expandable, and its functionality may be highly informed by user preferences and policies.

ASPIC services can be developed using major high-level components. The application level framework may relying on existing and evolving underlying technologies such as Web Services, Liberty Alliance, Security Assertion Markup Language (SAML), XML, SOAP, HTTP, IP, WiFi, Ultra Wide Band (UWB), radio frequency identification (RFID), Sensors and Sensor Networks, Pattern Recognition, Voice Synthesis & Recognition, application programming interfaces (API's), Objects, Cryptography, and the like. The re-usable components may be high-level, feature/capability-rich-logical sub-services, some of which are visible to the customer/user.

The ASPIC services can build on each other with integration of sub-services and/or components via an associated model/method to facilitate needed interactions. ASPIC services may also utilize existing types of infra-services such as Remote Authentication Dial-In User Service (RADIUS), Lightweight Directory Access Protocol (LDAP) and the like. The resources utilized for the services may be networked, including client-server and/or peer-to-peer and/or mediated. As noted above, the service may be modeled, but not necessarily exclusively, using anthropomorphic features and architecture and other analogies. Such a model may facilitate and/or simplify interaction with customers/users by matching human expectations and experience to simplify usage. Development of services may also be aided by use of an organized conceptual architecture and the architecture may be policy and preference based, which may improve user experience and convenience.

In some embodiments, constrained component interrelationships may be used to provide added security and integrity to the provided application services. Security may be integrated in the framework in an expandable, usable, comprehensive and flexible manner.

The components/sub-services of the framework providing the services may be visible to a customer/user or may be invisible infrastructure components. Each component may have associated functions and aspects, where aspects may be automatically switchable, depending on the current context or situation. Visible components may also have user selectable "personalities" and the personalities may have different defaults based on demographics or the like associated with a user. Personalities may also be inferred based on user/customer preferences. In addition, from a billing perspective, different charges may apply for different formats of presentation of services, such as different personalities. As invisible components need not interact with a user/customer, personalities related to those invisible components may not be beneficial.

The framework may also define the interactions between components. For example, visible components may interact with invisible components, with the option of interface modules therebetween providing restrictions on the interactions. Invisible components may also interact with other invisible components, again with the option of restrictions. In some embodiments of the present invention, visible components do not interact with other visible components except through an intermediary/interface component.

A variety of possible components/sub-services (also referred to herein as application service providing modules) will now be described. Visible components, with examples of personalities or aspects include: Butler (Traditional, Modern, English, American); Planner (Calendar, Shared, Arranger); Assistant (Personal, Shopping, Small-biz, Large-biz, Health, Consultant, Brainstorm, Life); Confidant (Psychologist, Friend); Tutor (Subject, Storyteller); Educator (School Page, Continuing Ed, Career Coach, Religious); Info & Entertainment (Critic, Suggestions, Downloader, Vid Page, Sound Page, Art Page, Simulator, Poet); Gamer (Buddy, Group, Training Mode); Financial (Bill Payer, Analyst, Coordinator); Security (Guard, Bodyguard, Policeman, Soldier, Deceiver, Spy, Vault); and/or Helpdesk (Interactive, Manual). It is to be understood that this list of possible optional application service providing modules is not all-inclusive, in that others can be added. The possible range of functions associated with each listed component may be as expected in the associated list of the corresponding anthropomorphic counterpart human service provider.

Examples of possible invisible components will now be provided. Invisible or infrastructure components may include: Security Monitor; Security Controller; Security Tester; Security Examiner; Mimic; Deceiver; Safe Mode; Preference & policy manager; Data-store; Restoration manager; Scheduler; Predictor; Pro-Action Engine; Composer; Arranger; Conductor; Reviewer; Verifier; Restrictor; and/or Mediator. It is to be understood that this list of possible optional infrastructure components is not all-inclusive, in that others can be added.

As the infrastructure components above are not identified based on a simple anthropomorphic model, descriptions of possible functionality of the modules for various embodiments of the present invention will now be provided. The Security Monitor may monitor security-related events (via distributed/logical sniffer and/or Verifier log crawler). It may also analyze and calculate scores for problems, anomalies and suspicions. The Security Controller may control ASPIC security via all security-related components and maintain and manage high-sensitivity security data. The Security Tester may conduct tests, scans and probes as needed and participate in off-hour checks. The Security Examiner may run off-hour checks and receive/record responses and observations. It may also determine scores for integrity and/or stability. In addition, settable/adaptive thresholds may be provided for triggering (e.g., change mode) and/or alarm responses, which may be used with pre-configured and adaptive rule processing in any of the security-related components/modules.

The Mimic may receive information from the Security Monitor and/or other components and may be used by Security Controller, Tester, and Conductor to perform monitored replay of events, for security purposes and/or for efficiency evaluation of ASPIC operations (e.g., short-cuts). The Deceiver may generate monitored obscuring/confusing traffic to increase outsider "background noise." This function may be based on pre-configured obfuscation and/or adaptive obfuscation via Security Monitor or the like and may be based on special "deception" needs identified during usage. The Safe Mode may provide various levels of guaranteed-to-function ASPIC operation and report safe-mode status to a service provider.

The Preference & policy manager may update preferences, manage policies and store data, such as storing all ASPIC preferences, policies, histories, timed events, billing records and the like. It may also store configuration/"state" backups for ASPIC for all the component module and store security-related data in a separate memory compartment. The Restoration manager may conduct and verify timed or commanded backups and restore a trusted backup as needed, and manage restoration to ensure proper functioning. It may also initiate alarm and fallback to appropriate safe mode if a restoration fails. The Scheduler may schedule all ASPIC timed events/requests/needs.

In some embodiments of the present invention, the Predictor accesses Composer-Verifier process and monitoring results and utilizes configured rules and preferences to make tentative needs predictions. The Pro-Action Engine applies filters to Predictor results, sorts them into an appropriate handling model and initiates fulfillment of predicted needs. The Billing Interface may collect billable inputs from Verifier and format billing data for external systems and accomplish and record billing (interfacing with external entities as needed).

The Composer may determine need for an action or result and set up a prioritized list of needs. It may also add associated information (qualifiers/flags/footnotes/links) as appropriate. The Arranger may process a final needs list, assigning specific needs to a component or set of components and process qualifiers, flags, etc. to provide usable inputs to the Conductor. The Conductor may set up actions, set modes, contexts, and objectives, send and activate scripts, modifiers, and directions and revise these if needed based on feedback from the Reviewer or Verifier, and may generate alarms as necessary.

The Restrictor may provide one-way (or two-way) filtering/checking/error detection between components. The Mediator may act as a functional intermediary between visible components and also act as an intermediary between ASPIC components and external networks/resources. The Mediator may, based on context and/or rules, also involve invisible components in the "mediation" process. The Reviewer may receive low-level responses and check a subset of data items and may verify expected acknowledgments or sends errors to the Conductor. The Verifier may receive final high-level responses and check a subset of data items. The Verifier may have settable/adaptive score thresholds to trigger error handling and/or a high-level alarm. It may also analyze and calculate a verification score.

Thus, as described above, the ASPIC framework layout may be networked and include a plurality of individual components as described above. The framework may also be viewed as logically including three "zones." The ASPIC "vis-ible" zone may contain all visible components while the "invisible" zone contains all infrastructure components. A customer zone may also be provided. Other zones or subdivisions of zones may be added as needed or desired. In addition to the components/modules, policing/control points may be provided, for example, using multiple Restrictors and Mediators between each zone. Restrictors may be provided for customer to visible component interactions. Mediators may be provided for visible to invisible component interactions and for visible to visible component interactions. Restrictors may also be provided for invisible to invisible component interactions.

Interactions within the ASPIC framework may be controlled by the Security Controller, including monitoring in all zones, monitoring of inputs to each component and of outputs to a customer/user. Interaction monitoring history may be recorded by the Security Monitor or Verifier for later access. Secure connections may be supported in all cases, which may be authenticated for endpoint verification and/or encrypted for message privacy and integrity. In some embodiments, separate "Provider," "Administrator" and/or external "Billing Systems" or other external network/resource interfacing and handling may be provided.

While a functional flow of interactions within the framework will be more fully explained with reference to various examples later herein, a high level overview will now be provided of an exemplary flow. Security may be monitored and managed within the framework throughout these operations. A customer/user would initiate action by presenting a user request. A request receiving visible component may then initiate appropriate fulfillment of the request (which may also result in indirect results and updates of data/state within the ASPIC framework). Interactions with other visible component(s), through Mediator(s) and interactions with invisible components, through Restrictors, may generally follow, as well as infrastructure interactions, via Restrictors. With reference to the terminology of various modules presented above, a need is then Composed and Action is Arranged and Conducted. The action results may be Reviewed and feedback returned to the Conductor if necessary. Security scores may be calculated and a high-level result may be verified and error handling may be invoked if necessary. Overall result security may thereby be ensured.

In addition the Predictor may propose additional needs/actions/requests as a predicted/potentially desirable continuation of current request fulfillment, or potential extension of same, perhaps as future timed event(s). The Pro-action engine may filter these predictions and initiate as appropriate. Billing, backup and, when needed, restoration in whole or in part, may also be provided.

In some embodiments of the present invention, security may be enhanced via use of contexts. Contexts may be more than "user context" or "application context" in which a user is doing something. Instead, ASPIC context is to be understood from the perspective of component entities within the framework, as they proceed to accomplish their operations, from their viewpoints.

Context within the ASPIC framework refers to detailed internal conditions/indications/assessments at various points and hierarchies within the framework, not simply to "what is being connected to," "what type of transaction is occurring," "what zone is being accessed," "what is included in the transaction," and the like. Pertinent contexts may be referred to by the various framework application service providing components in order to self-adjust their modes of operation, options they employ, alternate approaches they use in transactions with other components, parameters they use in their internal processing, methods available in their programming, filtering of messages they receive and/or forward, and the like. By being provided access to those particular selected contexts (generated at various points throughout the framework) which (via the design and arrangement of the framework) have particular bearing on its own operations and actions, each framework component (and pre-defined component group) may be provided with the pertinent global-to-local framework knowledge that enables it to modify its operation so as to increase framework security, reliability, and functional flexibility.

In some embodiments of the present invention, three or more context levels may be utilized. One level is a high-level "global context" for the ASPIC framework as a whole, which may be rather general. For instance, this global context may indicate general security levels or alert states for the entire framework, which the Security Controller has determined based upon inputs from throughout the framework, processed (as may generally be the case within the framework) by applied rules and thresholds. This global context may have an impact throughout the entire framework, potentially on all components and all their instances (if there are multiple instances of a particular component), and, for example, may modify component interactions (and the operations of components themselves) to be more open and facilitative (less strict), or, conversely, less open (more strict). Global context may be easily utilized, but it may not be as important or advantageous as the lower levels of context described below.

Below the global level is a medium-level "group context" for at least each of the most common pre-definable groupings of ASPIC components, where each grouping may be defined as the set of components that together perform a typical high-level action (e.g., modifying a user's calendar). Group context may include greater detail than global context. Groupings may overlap, as a particular component may appear in more than one grouping. Also, a grouping may be limited to contain at least one component but more typically may contain 3 to 6 components. Invisible/infrastructure components may appear in almost all the groupings, especially certain security-related and action-initiating components, such as the Security Controller and Conductor, respectively. Group contexts are defined as having an effect only within a particular group.

Below the group level is a low-level "component context," which deals with one component only, potentially in even greater detail than group context. This component context that may affect the internal operation of a specific component to be more or less strict, when such options are available. It may also indicate specific error conditions or impairments within an individual component. Although component context is referred to as describing just an individual component, it may still be considered in processing an interaction between multiple components. In particular, component context for an individual component may have bearing on how transaction processing should occur when that component is one of the endpoints for a transaction.

Multiple context types may also be utilized for each of the context levels. Context types may include, for example "security" context and "operational" context. Operational context is not security centric but, instead, refers to specific operational conditions that are present, which may be useful in adjusting the operations of interacting components with improved flexibility and preciseness so that they can function better together by adjusting themselves to each other's current condition.

As one example of a particular embodiment of the present invention, a context may be described and communicated as a digital string of length N bits, where fields within the string may be pre-defined with various lengths L<M, and allowed numeric values (which optionally may be mapped or coded to corresponding alphanumeric meanings) up to $L^2$ when binary numbering is used. At the smallest separable unit of context in such embodiments, a context unit string may contain at least (a) a sending component identifier, e.g. number, (b) a destination component or component group identifier, e.g. number, (c) a context or context unit identifier, e.g. number, (d) a bit length value number, and (e) concatenated fields comprising the entire context or context unit in a pre-defined order, where each pertinent field is populated with the appropriate numeric value for that particular context. For processing efficiency, context units may be concatenated together successively so that a component has only one master context string upon which to operate. This master context may contain all the contexts applicable to that component (including global context, all group contexts of which the particular component is a member, and its individual component context). An archetypal master context may include a pre-defined ordering of all possible framework context units (separable context portions with one or more identifiers) so that ordering within the master context is always the same, even though many possible context units may be omitted in any particular master context instance.

Example context fields may include global/group/component security alert levels, global/group/component specific security alerts, global/group/component latency or delay warning levels, global/group/component error conditions, global/group/component hold conditions, global/group/component current trust levels, global/group/component specific attacks-in-progress indicated and the like. An appropriate or desirable number of levels can be used for alerts and trust indications (e.g., 7 numeric levels, or high/medium/low, or 5 levels with 2 sub-levels each and so on).

As the Security Controller may be configured as the most protected and most trusted participant in this process, the primary determination and communication of contexts may be accomplished by the Security Controller, taking inputs directly from a framework component, or indirectly from, in particular, the Security Monitor. The Security Controller may send context information to each component or component group. In some embodiments, each component in a group knows all the components in that group. Therefore, within a group, a context may optionally be forwarded to other group members.

In addition, for some embodiments, components will periodically report to the Security Controller, either directly or via the Security Monitor, their current understanding of all contexts applying to them. This reporting may enable the Security Controller to verify that all contexts are up-to-date, consistent, and correct. The reporting may also enable the Security Controller to detect anomalies, such as due to attacks or hacking, which may cause it to update the framework's global security context.

Certain types of context updates may also be determined and provided by a component to its pertinent neighbors (e.g., those with which it is communicating as part of a grouping for a particular transaction or transaction type). This may be done at a variety of times, for instance, to inform a neighboring/group component that some error condition exists that might be important in further processing of a transaction. These updates may be examined and selectively filtered (accepted, or denied with notification back to the sender) by Mediators. Mediators may employ stricter filtering rules when either the global framework security alert level or group security alert level is higher (and/or when the sending component trust level, or the pertinent group trust level, is lower). Additionally, the rates of change of these levels can be used to adjust the strictness of filtering. Mediators may also be configured to filter out updates reflecting more drastic context changes of any sort, unless there are supporting indications (e.g., context or context changes at other levels, context or context changes of other types, or other non-context communications, such as messages from the Security Controller, Security Monitor, and/or Security Tester) that a drastic change may be valid in a particular case.

In some embodiments of the present invention, Mediators are present between communicating peripheral/visible components in the framework. In some cases (e.g., at a critical point in the processing of a sensitive transaction, especially if the security alert level has been increased or is rising quickly), an intervening Mediator may actively request a context update (or an update of specified context units) from one or both of the endpoint components it connects (in order to ensure the most up-to-date information). Thus, communicating components may be asked to provide context updates, for example, concurrently with particularly sensitive or important messages/transactions. This update requesting may be done for all transactions, but framework and communications efficiency may benefit by limiting such update requests, for example, based on the expected or designated "value" of the transaction occurring, which may be pre-defined partially via transaction type but may also include parsing the message content to determine an associated explicit dollar amount when the transaction is financially-related, or to apply a rule or algorithm based mapping of the content or type to a approximate dollar range/severity/importance table.

Context updates may be supported by communicating selected updated context units, which may be received by a component and then inserted into that component's master context (, for example, replacing the previous version of that context unit). Entire contexts may be transmitted, but doing so may be efficient when only a portion of the context (i.e., selected units) has changed. On the other hand, when an entire context is desired to be checked or verified, for example, in the case of periodic communications by a component of all its pertinent current contexts to the Security Controller for consistency and accuracy checking, the entire contexts may be transmitted. The transmitted contexts may be compressed for improved communications efficiency.

As noted above, contexts may be used in connection with operational and/or security aspects of the ASPIC framework. Various embodiments of the present invention providing security using contexts will now be further described by way of example. In particular, the specific embodiments to be described utilize context and interlocked state machine models in connection with implementation of security in the framework. Contexts may be used in conjunction with multiple "interlocked" state machine models describing each possible framework transaction at different levels, both for endpoints and as a whole. Incorporating such checks and balances may provide an increase in the security and/or reliability and/or functional flexibility of providing application services to a user within the context of the ASPIC framework and its associated application service providing components.

A state machine, as used herein, is a model of a system consisting of one or more stable states, wherein the system may transition from one state to another responsive to input triggers, timers, task completion and/or due to some other cause. States may be connected to each other (transition-able from one to the other) in substantially any specified fashion. Thus the state model may be visualized as somewhat like a flowchart; however it may be much more complex in terms of cross-connections.

The ASPIC framework in some embodiments of the present invention includes a set of pre-defined state machine models for each possible transaction within the framework, including at the periphery (i.e., input and output). Several transaction levels may exist including: high-level "need" and "response" (e.g., a high-level request by a user, followed by that need being satisfied and this being reported/indicated in some fashion); medium level component-to-component interaction (the "nuts and bolts" of how the need is satisfied via the internal workings of the framework); and low-level protocol interaction (e.g., TCP/IP communications protocol level). For each definable transaction (in practice, usually starting at the high-level transaction), separate state machine models may be defined for each of these levels.

For each of these levels of state modeling, at least several transaction locales will generally exist, in that each endpoint as well as the overall transaction may be modeled. That is, each end of the transaction (e.g., two components communicating with each other) may be modeled in terms of their internal states and the transaction as a whole may be separately modeled in terms of messages that should flow back and forth in one or more allowable sequences. While the endpoint node and transaction flow models may be separate, they will generally be interrelated in that they will generally be correlate-able as a transaction proceeds from start to completion.

Some things related to the framework would ordinarily be considered "stateless" in that they do not inherently incorporate characteristics amenable to state machine modeling. For example, the User Datagram Protocol (UDP) in the IP (Internet Protocol) suite is generally considered stateless, as opposed to the Transmission Control Protocol (TCP), which incorporates "handshaking" that provides reliable transport of data packets over the network. TCP handshaking and the underlying processing involved can be readily modeled in state machine manner, thus, TCP is considered "state-full" rather than stateless.

Stateless processes generally cannot be modeled as a state machine, and so are not suited to use in isolation within the ASPIC framework interlocked mediation as described below. However, even stateless things, when considered in the context of a larger or more complex process can be included in the larger state machine model associated with the larger complex process. For example, although stateless when considered on its own, UDP, when used to communicate transactions between two applications, may be included in the state machine model that includes both applications/endpoints and what they are accomplishing via those UDP-enabled transactions. Likewise, in the ASPIC framework any stateless processes/events/actions may be included as appropriate in the state machine models of the greater (broader scope) more complex processes or transactions in which they exist. Thus the ASPIC framework's usage of state machine models with contexts, described below, can include stateless things as long as they are defined as a part of a broader or greater process (which will generally be the case, particularly if the process model is designed or chosen to allow such state modeling).

In some embodiments of the present invention, to describe and use state models, the models as well as their constituent states and transitions are uniquely identifiable in some fashion across the framework. An example of a suitable state identifier format would be the concatenated string of an "M," followed by the particular model identifier (e.g., model number), followed by an "S," followed by the particular state identifier (e.g., state number). An example of a suitable transition identifier format would be the concatenated string of an "M," followed by the particular model identifier, followed by a "T," followed by the particular transition identifier (e.g., transition number). With these particular formats, the numbering of the states and transitions does not have to be unique across different state models (because the unique model identifier is included). Alternately, if it is desired to avoid the requirement that the model number itself be unique across the framework, the formats may be modified to first include unique component identifiers, e.g. component numbers. In any case, the framework component identifiers in some embodiments of the present invention are unique as they may be used for many purposes within the framework. If multiple instances of a particular component are created and used, sub-identifiers can be appended to the component identifiers to maintain uniqueness.

Usage of interlocked state models with contexts will now be described with reference to a particular example. For purposes of this example, once the state models are defined, they are incorporated into the framework and processed in a fashion by which they will be both (a) interlocked and (b) modified by context. Interlocking may be performed by Mediators (for example, when the scope of a transaction is infrastructure/invisible to periphery/visible, or periphery/visible to user) and/or Restrictors (for example, when the scope of a transaction is infrastructure/invisible only). Interlocking may include applying checks to ensure that communications and messages conform (at each transaction level) to the specific possible states and transitions expected at the current position of each pertinent state machine for that transaction (i.e., corresponding to the exact point currently reached in the accomplishment of the transaction). Otherwise, the message may be blocked, logged (either briefly or in detail, depending, for example, on the severity of the exception encountered) and, optionally, alarmed to the Security Monitor (and in extreme cases, optionally causing an alert to be sent to an administrator). Note that in this example, all state machine models maintained and continuously updated in the Mediator should agree, but some "looseness" may be allowed as described below.

In terms of being modified by context, both "security" context and "operational" context may have an affect. Operational context may indicate that error conditions or delays are present, which may be sufficient to relax the interlocking somewhat. As noted previously, while interlocking should be maintained, a varying degree of leeway may be granted in terms of timing or in terms of specificity. For example, a participating component may be overburdened so that it is sending messages slightly out of order or otherwise at the wrong time, or a component may be partially malfunctioning so that it becomes somewhat difficult to discern exactly what state it has transitioned into (even though those possibilities are limited, not completely unknown). Any degree of leeway granted in a particular circumstance may be adjusted to be enough to enable further processing of the transaction (and associated state machine models), but not so much that the advantage of the state model approach is overly diminished.

Security context may also modify the transaction processing in the framework. If the security context contains high security alerts, lowered trust levels, significantly high rates of change, or similar conditions, then the potentially available leeway described above may be decreased in appropriate degree and (under sufficiently extreme conditions) may not be allowed at all. This approach may provide for continual adjustment in the framework to maintain an acceptable balance of efficiently versus security, which balance "target" may be adjusted to a measured degree as necessary, for instance via changing global/group/component security context.

Not all states/transitions for an application service providing module (component) need be visible, as only some of the component states may result in normal messages being sent at that time, allowing other framework components to infer by their presence (and type or content) that a state or state change has occurred. Other state transitions may be explicitly communicated. In some embodiments of the present invention, for "non-inferable" (visible) state transitions not associated with any normal messages being sent at that time, explicit "transition update" messages may be sent by the component to notify one or more other components that it has progressed to a new point in its state model. In other embodiments, the component may transmit context updates that explicitly identify the new state reached. In yet further embodiments, state transition messages are used to notify the framework of all state transitions, including those which would ordinarily be inferable, as this may simplify the message processing/interpretation by eliminating the need for other framework components to actually infer the sending component's state transitions (for those states/transitions that have associated transmissions of normal messages of type and content that allow such inference).

In some embodiments of the present invention, a component sends context updates to identify its newly reached states only when major/important states are reached. In the interim, transition updates (which are likely to be smaller messages than context updates) are sent for transitions to states of medium importance. States of lesser importance that are reached are temporarily logged and later summarized and included as a state identifier sequence string within the next transition update sent upon reaching a medium and/or high importance state. The importance categorization for each state may be specified in advance as a matter of design and implementation, for example, by designers and developers in consultation with security experts. A component's state model may contain myriad states, possibly being extremely detailed, with some significant percentage of the states/transitions modeled not being initially chosen to be immediately communicated. However, with experience gained in operating the framework, this choice could subsequently be modified via software updates if it is determined that security (or reliability or functional flexibility) would be sufficiently enhanced to warrant a modification raising the importance of a state.

In particular embodiments of the present invention, an interface module, such as the Mediator will observe all communications between the components which it mediates. It may, therefore, infer state transitions from normal messages associated with state transitions, or from context/transition update messages. Both normal messages and state transition messages sent by a transmitting component may be forwarded to other mediated components so that they can, as appropriate, modify their operations (via operation mode/option selection or parameter adjustment) with knowledge of the state of the sending component. Providing such communications by the Mediator is distinct from and in addition to the various security aspects of a Mediator, such as derived from an interlocked state model based mediation of communications by a Mediator or Restrictor as described above. These state transition determination and communications may improve functionality and reliability in the framework.

The flow of normal messages and context/transition updates may occur in the same communications channel or may be implemented in a separate channel(s) (i.e., the context and transition information may be done "out-of-band" from the normal transactions). The choice of message channel may be based on tradeoffs associated with communications bandwidth and latency, security, efficiency and the like.

It is believed by the present invention that known software/hardware/communication systems generally lack the knowledge of endpoint state provided by some embodiments of the present invention including the multi-level/locale (general to detailed/endpoints plus overall) interlocked state models descried herein, lack the continuous correlation of these multi-level/locale models provided herein by the interlocked processing, and lack the ability to modify their operation and action according to changing conditions as provided herein by modification of the interlocked processing via multi-level and multi-type dynamic context updating in some embodiments. These features and their combination may provide the ASPIC framework an improved approach to securing its operations and applications.

In particular, note that the medium-level state modeling may incorporate very detailed knowledge of the inner workings of the endpoint components for each communicated framework message. Correlating the simultaneous interlocked progress of both endpoints through their allowed state transitions (for example, via the pre-defined models exercised within the Mediator/Restrictor) may reduce the risk of malicious software intrusions/hacking/attacks altering the essential workings of the components pertinent to the current transaction. When this is layer of security is provided for all or a subset of transactions, security and integrity may be assured in a manner not provided by known systems. A further aspect of some embodiments of the present invention described below can additionally vary in a controlled fashion the operations (and associated state models), as well as the correlated interlocked mediation processing, used within the framework, which may even further increase the difficulty of successful intrusion or hacking, and, thus, additionally diminish the possibility of any attacks succeeding.

Controlled variation of interlocked state machine models according to some embodiments of the present invention will now be described. Although the described variation may entail extra effort and complexity, it is generally possible to design and implement framework components in various ways, some which are similar in most respects whereas others exhibit significant dissimilarity. By purposely choosing a number of sufficiently dissimilar designs for the operation of each significant ASPIC component, and implementing the framework such that each component incorporates the capability to operate in a number of dissimilar ways that can be sequentially selected in any reasonable order by the Security Controller, security may be further increased when incorporated in the state machine approach previously described (with interface modules such as the Mediators and Restrictors being suitably synchronized with the selection sequence).

Dissimilar designs may be selected to engender significantly different state models. As transactions are generally defined as accomplished using two or more endpoints, selecting new dissimilar operations for a transaction will typically change at least some of the multi-level/locale models associated with a particular transaction. These additional selectable models can likewise be incorporated into the framework. Interlocked processing of transactions can then be changed accordingly when a new selection is made, for example, by the Security Controller, even if somewhat unpredictable sequences of changes are used. A long non-trivial sequence of such changes may make it exceedingly difficult for a potential attacker to both understand and exploit the (changing) operations of the pertinent components as well as the (synchronized and changing) interlocked mediation processing associated with the progress of each transaction from start to finish.

Therefore, in some embodiments of the present invention, the framework for providing application services to a user may utilize such a variation capability by incorporating the numerous dissimilar operation modalities into each component in a selectable fashion, incorporating associated selectable state models into the interface modules such as Mediators/Restrictors, and configuring the Security Controller or other aspect of the framework separate from or incorporated in the application service providing modules to select and communicate a sequence of operation modality changes to the pertinent application service providing modules, controllers and/or Mediators/Restrictors. Changes in operation modalities may be made at appropriate times, such as transition points between congruent states in the current and new modality (rather than at points in which a modality change would break the smooth progress of the transaction). Interlocked mediation processing may likewise be changed at the appropriate time in order to prevent undesired filtering of valid transaction methods. In some cases, only one endpoint modality may be changed. In other cases, multiple endpoints may be changed simultaneously to maintain each end's ability to understand and continue processing whatever is being transacted.

Modality change messages to a particular component in some embodiments may include at least (a) the new modality identifier, e.g. modality number, (b) the numeric time and/or state at which the new modality should be engaged, (c) the identifiers of all other components whose modalities are being simultaneously changed, (d) the time period for which the new modality will be valid, and (e) the identifier of a fallback modality in case of error. Modality change messages to a Mediator may include the above items for each component served by that Mediator, but with item "(c)" omitted. Modality change messages may be sent in advance of an impending mode change, and the sequence chosen by the Security Controller or other controller may be formed, for example, via well-know pseudorandom (PRN) code sequence generation, with a pre-selected offset, where every S bits (e.g., 8 bits) of the PRN code is used as a field to identify the next mode in the sequence (so as to produce a relatively unpredictable and long-term non-repeating sequence).

As noted above, in various embodiments of the present invention the framework provides various automation characteristics. Particular embodiments including two broad aspects of the ASPIC framework that may enable qualitatively improved automatic action in a novel, inventive fashion, referred to herein as prediction/pro-action and needs processing, will now be further described. Automation in the ASPIC framework may be accomplished, among other things, may be supported via (i) the Scheduler, Predictor, and Pro-Action Engine for the purposes of determining at least potential future activity, and (ii) the Composer, Arranger, Conductor, and Reviewer for the purposes of accomplishing fulfillment of a particular user request to meet resulting needs through action by ones of the application service providing modules.

Item (i) above may utilize non-real-time processing, such that any associated delay is not normally critical. In contrast, item (ii) may generally involve real-time or near-real-time actions, where it may be desirable to minimize or limit delay to within acceptable limits. Furthermore, for purposes of simplifying the explanation herein, automation operations will be described with reference to a particular allocation of operations to particular modules (typically invisible to the user) and the interaction therebetween. It will be understood, however, that other distribution of operations across modules and interactions therebetween also fall within the scope of the present invention and that all of the particular processing for the configuration below need not be used in other such embodiments to provide the automation results described herein.

Prediction/Pro-Action operations (item (i)) for embodiments of the present invention will now be further described by way of a particular example. In context, for this example, the Scheduler takes inputs from other framework components and forms pre-scheduled framework events, including high-level "needs list" input for the Composer. In this respect it generally enables only basic automation as its actions are typically dependent, at least indirectly, upon actual user inputs or commands fully understood and intended by the user to result (at least potentially) in future action. However, the Scheduler may also be configured to take scheduling input regarding predicted actions that have been generated by the Predictor and Pro-Action Engine, subsequently processed into needs lists by the Composer, and then stored for later triggering or scheduling (as will be described more fully with reference to the item (ii) automation example below).

Prediction and pro-action may enable advanced automation of fulfillment of user needs, beyond processing of received user requests, and may be accomplished in the framework for some embodiments of the present invention by following/monitoring the needs processing described below and by both monitoring/recording past occurrences (at a high level) and inferring a set of possible future actions which might be desired. These inferred future actions may be simple re-plays of past occurrences, but may also incorporate tentative modifications taken, for example, from pre-configured lists of options. Option lists may be default, user preference filtered and/or user created/modified. In particular embodiments, a maximal set of inferred future actions are generated, which are only tentative, being far more numerous than desired (as they purposely include a broad range of possibilities, potentially including virtually every potential possibility).

The Predictor may accomplish the first stage of the prediction by monitoring the actions of the Conductor component described in detail below in the context of need processing so that an initial prediction can be made. The information processed by the Conductor to actually initiate actions in the framework to fulfill needs may include the high-level finalized needs list information (which may have been previously provided by the Composer), which may subsequently be used (directly or after being modified) as input to the Composer for later realized (triggered or scheduled) instantiations of previously-predicted actions.

The Pro-Action Engine in this example receives the initial predictions from the Predictor and maximally expands these to incorporate all options and variations that may potentially apply (to the extent incorporated within the prediction/pro-action model or rules). This may be understood as somewhat like a human "brainstorming" session, where it may be desirable at this stage to avoid limiting the results. By generating a large number of initial potential actions, the basic predictions may be purposely expanded to include all reasonable (predictable by the model or rules) possibilities. Thus, a broader working range at this point may be more likely to include a particular action a user (either categorized within a certain profile, or a particular user) will value at a later time.

The Pro-Action Engine may subsequently apply filtering to the tentative predictions determined by the Predictor and expanded. Filtering may be done using processing rules with inputs from the user's configured preferences (such as a profile category and/or individual custom/modified preferences). Preferences may be chosen as one of a set of default user profiles, can be user modified defaults and/or can be user created (custom). For this example, at this stage the broad working range is narrowed based on knowledge of the user. The result may be configured to be the maximum number of predictions of potential desired actions actually pertinent to that user (or class of users) given previously monitored framework events. While a human referenced process of expansion followed by contraction of possibilities is described above, it will be understood that multi-faceted filters/models/rules may be utilized that incorporate both aspects in a single process.

The narrowed, filtered predictions may then be sorted into handling models. Different types of predicted future high-level actions will generally fall into different approaches for accomplishing them (given the nature of typical user needs). As an example, some types of high-level needs/actions will be accomplished without any further input from the user. Other needs/actions will utilize subsequent user input, for which the handling model may plan. Other needs/actions will allow, but not require, subsequent user input.

In a similar manner, some needs/actions may be accomplished by the action of one framework component. Others may require a group of components to work together. Others may require multiple groups. There even may be additional handling models depending on the kinds of cooperation or interaction needed between different components or groups, such as whether the cooperation is mandatory or merely helpful, whether the interactions are for optional functionality or are security-related, whether the interactions are with peripheral/visible components or infrastructure components or a mixture, whether the cooperation has an inherent time limit and the like.

Likewise, some needs/actions will be expected to be accomplished straightforwardly in a relatively short time period. Others will require framework activity over a long time period, perhaps with some activity delays or holds, with subsequent continuation events explicitly scheduled for later accomplishment. There are many combinations and factors such as these that may best be planned for via use of handling models, which basically structure the high-level need (in accordance with the various major capabilities and features of the framework) for later action command expansion during needs processing. Filtered predictions structured by handling models may be matched to high-level needs to be provided to the Composer.

Needs processing will now be further described for particular embodiments of the present invention by way of an example. As with the prediction operations described above, while this example is based on a particular allocation of operations between different components and the interaction therebetween, the present invention is not limited to the particular configuration described for the example herein.

For this example, operations will be described starting with receipt of output from the pro-action component discussed above. However, it will be understood that need processing responsive to receipt of a user request will proceed in a similar fashion with distinctions being clear from the example to now be described. The Composer takes the pro-action input and produces a prioritized needs list, adding associated information (qualifiers, flags, footnotes, links) as appropriate based on the specific parameters included in the original prediction input obtained and processed by the Predictor. Needs may be pre-configured into lists and optionally into categories, and may be matched within the Composer to the inputted prestructured predicted actions provided by the Pro-Action Engine using matching rules and various associated matching techniques known in the art. If a match is not possible, an error may be logged and the administrator may be alerted. The needs list output of the Composer, when originating from prediction/pro-action, may not be immediately sent to the Arranger (as it is still a predicted not triggered need) for further processing & expansion, but will generally instead be stored for later triggering or (if there is sufficient information gathered by other components and provided to the composer, suitable for determining specific future timing) explicitly scheduled via the Scheduler.

Triggering may be supported both by visible components (interfacing with users) and infrastructure components (in terms of behind-the-scenes events related to users, for example when a scheduled user event is activated automatically). Triggering generally occurs either when a component sends a "potential-trigger" message to the Composer, which may contain one or more categories of event types, and/or when the Composer itself directly determines the need to trigger a stored needs list based on its current real-time processing of another needs list (which matches an event type of one or more stored needs lists). Potential-trigger messages do not necessarily result in actual triggers, as they may be sent without detailed knowledge of the stored needs lists. Rather, the Composer, upon receiving such messages, will generally check the stored needs lists to determine if there is a match and, if a match is found, will trigger further needs processing for the triggered need.

In the present example, the Arranger processes the final needs list (at the time it receives the list as output from the Composer, whether triggered or scheduled) by assigning specific needs in the list to particular framework components or component groupings, for example, via their identifiers. In the event that a need cannot be assigned due to technical reasons, an error may be logged and the administrator may be alerted. However, if required resources are simply busy, the Arranger may temporarily store the need pending assignment when resources again become available (for example, framework components can indicate delays or temporary unavailability via their dynamic context, which may be made available to other components, such as the Arranger, as well as other components with which the unavailable component interacts and components which are grouped with that component). If the needed resources do not become available in an acceptable time period, an error may nevertheless be logged and the administrator alerted. The Arranger may also process the associated information to place the list into a format suitable for input to the Conductor.

The Conductor may set up the actual actions by expanding the items in the formatted needs list into sequences of "nuts and bolts" medium-level activities with associated "options" (which may be categorized as including "modifiers" and "directions") and error handling procedures. Thus a hierarchy of actions or potential actions may be provided in the framework. At the highest level there are "needs," which are in many cases easily understandable by humans since they reflect the user perspective to a large degree and generally are determined based on a received user request or a predicted need that is triggered. An example need would be "a new calendar entry is required and must be created and managed." Such a need may result from a user request, for example, to schedule an appointment for a haircut.

A brief example of a needs list omitting the associated parameters would be "(1) a new calendar entry is required and must be created and managed, (2) the new entry requires scheduled input from the user, and (3) the user requires reminders prior to the event." At a medium level, needs may be expanded into recipes as described below. At a lower level, components expand and process the medium level activities into sequences and/or branchings and/or sets of transactions or the like. At the lowest level, sub-modules of the components may expand the transactions into protocol exchanges, low-level system calls, memory accesses, processor operations and other such actions.

Options, as mentioned above, may specify major modifications to the baseline actions. A modifier may be considered a type of option or as a minor modification to a baseline action. Options and modifiers may be expansive, in that multiple options and modifiers can be added, optionally in a priority order, allowing for additional flexibility. Options and modifiers may be pre-configured to be dependent on interim results, in that a particular option or modifier can be selected via the interim responses received. On the other hand, a separate form of option for a baseline action may be provided as a "direction." Directions may be limiting, providing information that can be used as parameters to narrow or specify the scope or result of the action.

The medium-level activity list with included options/modifiers/directions may be considered as forming a "recipe," which may incorporate considerably greater capability than a common "script" as known in the art (as scripts are basically just "shortcuts" that contain a sequential list of operations). In particular, providing flexibility of operation with these recipes provides fundamental building blocks for framework functions that support application service modules running on the framework.

Additionally, in some embodiments, the Conductor may set some limited operational modes pertinent to the specific needs in the list, some types of context units, and objectives (expected acknowledgements which should result). Output from the Conductor may be sent to the specific framework component or component group(s) which will accomplish the needs/actions, which themselves will expand as necessary, in accordance with their programming, the medium-level action commands into specific sequences of activity and transactions informed by the additional included information (options, modifiers, directions, etc.). The Conductor may also, in some cases, receive error messages (e.g., from the Reviewer, discussed below) that will cause it to re-initiate a previously sent recipe, either in whole or in part.

To support prediction, the Conductor may forward selected high-level information to the Predictor sufficient for it to monitor the actions that are being initiated in the framework. Rather than constantly forwarding information, the Conductor, for improved efficiency, may store and summarize the information for transmission to the Predictor at the completion, for example, of each action initiation. As the Predictor may operate in non-real-time, the associated delay caused by such summary communication will generally be inconsequential.

The Reviewer, in this example, receives responses and checks a subset of the included/associated data items to determine that the expected results (e.g., via expected acknowledgements) have occurred, and that these are in the generally expected order (with some allowance made for network delays when acknowledgements arrive from different sources, over different paths), otherwise it signals appropriate errors to the Conductor in order to trigger re-tries up to a configurable limit. Acknowledgements may actually consist of so-called "Ack" messages but may be any of various types of otherwise-termed messages sent in conjunction with the completion of some activity.

Generally, a high-level need (or more accurately an action to accomplish that need) may be decomposed into a number of transactions and transaction sets, each of which may normally be expected to result in some sort of acknowledgement sent by the receiver or acting entity (which may be a framework component, or may be an external entity with which the framework is communicating) back to the initiating entity (usually a framework component, but sometimes an external entity already engaged in activity with the framework). When the receiver of an acknowledgement is a framework component, the component may summarize and echo the acknowledgement to the Reviewer so that it receives and is aware of that acknowledgement. When the receiver of an acknowledgement is an external entity, the sender of the acknowledgement will generally be a framework component, and this new component may summarize and echo the sent acknowledgement to the Reviewer for its use.

To further illustrate some embodiments of the present invention, a simplified example of usage of a Complete Simplification (CS) application service framework according to some embodiments of the present invention will now be described for a hypothetical household including parents, Jim (age 55) and Martha (age 49), their children Megan (age 25), Jason (age 20), Tom (age 15) and Tia (age 10). The family has two pets, named Spot (a dog) and Mittens (a cat). Jim is an accounting manager at a large corporation. Martha runs a part-time business out of their home. Megan works as a salesperson at a discount retailer, while Jason attends a downtown university. Tom and Tia attend local high school and middle school, respectively. The CS framework may utilize the home network, cellular and hotspot networks and Internet services and could be thought of as a "catch-all" for a number of related services potentially bundled together, but may also be a highly-integrated holistic service in its own right.

The framework, when using the Internet Protocol (IP) suite, may be viewed as an evolved IP centric integration of many possible applications that could leverage the flexibility and capability of next generation networking (both wireless & wire-line). It might also be viewed as a richly featured artificial intelligence network for IP. Network/service providers may operate as mediators, providing the logical integration used to obtain the full feature set and capabilities described and possibly to conduct billing, provide high availability & scalability, ensure security, provide automated backups and the like. Various enabling technologies such as wireless local area network (WLAN), Bluetooth, Ultra Wide Band (UWB), integrated wireless-wireline, web services, virtual private network (VPN), biometric & smartcard authentication, non-repudiation, digital rights management (DRM), and the like may be used in providing the framework, however, the depiction described herein does not focus on the enabling technologies. In addition, while this example is presented primarily in a household context, it will be understood that it is likewise extendible to a business environment.

Proceeding now with the example, in the morning, each family member wakes (Megan awakes remotely from the rest of the family in her own apartment, but is included as part of the household by logical association by the CS framework/service. Information and Entertainment components of the CS service provide the appropriate content (variable by user) to each person in the family, and likewise provide the appropriate controls or commands to each wireless-connected device previously associated with each person (or persons). For example, WLAN-controllable and/or Bluetooth-controllable appliances like clock radios, TV tuners, sound systems, lamps or light switches, and the like may be controlled by the CS service via the home gateway and wireless slaves or repeaters. Power-line communication technology could also be used.

Like the rest of the family, Jason wakes and takes a bleary look at the customized news feed, but unlike them he goes back to sleep since his first class is in the afternoon and his class load does not require studying this morning. He recalls he needs to update his schedule so that it better reflects his study habits of the last week or two. Sensing that he does not actually get up, the news feed switches to light jazz (streaming audio) at low volume.

Jim leaves the house for work. In his car he listens to informational MP3's (e.g., audio books or articles) downloaded automatically during the night according to his reading and continuing education settings, first a section of a new bestselling historical novel and then a short briefing on a particular accounting method revising the generally accepted practices central to his profession.

In her car, Megan is driving to see her mother, listening to some new music MP3 files downloaded last night by the CS Entertainment component according to her preferences. Preferences could be detailed or general. Each component could remember preferences for each user. Some preferences could be learned over time, while others would be selectable by the user. Selectable preference profiles might also be used. As it is on her way, she often drops by to have breakfast with her mom prior to being at the store by opening time. As she drives, she tells the car to copy some of the MP3 songs to her sister Tia, subject to applied DRM parameters where a security component of the CS service may block the copy operation. She knows Tia would like this sort of music, and because they commonly share files she is sure Tia does not already have the particular selections.

Martha does some planning for the family while making breakfast and seeing everyone off. A Planner component lists upcoming tasks with known deadlines, including needed pet vaccinations. She finds that the Planner, utilizing the Communicator component, has already checked with the veterinarian's office, for which the CS service authenticates the veterinarian's office computer, and has cross-checked her own schedule, and is suggesting several available appointment times this week to get the required rabies vaccinations for Spot and Mittens. Selecting the one she prefers, the appointment is automatically completed, verified by the vet's office almost immediately, and transferred to her phone/PDA according to her preferences. Martha also notices that Jim's car has notified, for example, by wireless message transmission, the Planner that it is nearly due for an oil change, so she flags that for his attention, in effect raising its priority and sending it to his phone for him to consider (the Planner will remind them again if not scheduled within the next week).

When Megan arrives, the CS Butler component informs Martha that her daughter is entering the driveway. The Butler component may perform some of the typical tasks traditionally associated with a live butler. It might be customizable in many ways, store preferences for household and user, and be selectable in terms of "personality," as for instance Martha prefers an "Italian" rather than an "English" Butler. Megan uses the thumb-scanner on her phone to unlock, subject to biometric authentication and/or smartcard and private key verification, the side door and makes her way to the kitchen where her mother is warming breakfast. They visit for a half-hour or so. When Megan leaves for work Martha turns to her home business, reviewing updated summaries prepared last night by her Business Assistant. Today, it helps prepare her for an upcoming lunch meeting.

Tom and Tia are on their buses headed for school. High school is tough for Tom this year since he is in advanced placement classes. He pulls up his latest summary session on his data phone to review the points he was having difficulty understanding last night.

Tia's middle school class plans a field trip today to the art museum. She uses her data phone to IM her friends in the other two 4th grade classes, so that they can synchronize their locators, such as global positioning system capabilities of the phone, protected for security/privacy by the CS service, to get together at the museum later. Through a Security component, Martha receives a request for locator usage from Tia's phone, and okay's the request after reviewing the authenticated/verified ID's of the other participants.

At work, Jim uses his data phone as his main phone (it switches to work mode upon sensing the work WLAN). He also stores files on the phone, and transfers files over VPN to his home office PC, with automated file transfers and mirroring. In both cases the Security component recognizes these as work files and applies appropriate restrictions and protections, such as smart card keying to Jim's identification for read restriction of the files. Note that the Security component both intercedes based on recognized context, and also proactively takes actions according to user preferences. Such actions may include arranging and protecting home computer backup data, and could support automated backup of data for Jim's employer as well. When used by an employer, it could perform additional cross-modal security functions such as monitoring home usage of work files and providing associated audit reports to the employer.

Jason eventually wakes up (his Assistant provides a timed sequence of reminders he has previously selected, or included in his selected preference profile) and heads to class. The family Planner updates his phone with various family-schedule data and merges similar information from some of his friends according to his permissions (monitored by the Security component). His Assistant notifies him of non-urgent messages from his father and brother, providing a brief summary. There may be just one Assistant, but since it maintains a different view for each user, it is convenient for each person to think of their own "personal" Assistant, Planner, Communicator, Tutor, etc. On the other hand, for a variety of reasons some CS components would likely be best thought of as shared or imposed rather than personal. For example the Butler is shared and the security component is limited in how it is controlled as it controls security policy.

At school, Tom uses his data phone to store & transfer class assignments. With mediation provided by the Security component, it can interface with the school WLAN and Bluetooth or UWB enabled PCs or laptops or projectors. Rules imposed by the school can be mediated and subsequently enforced by the Security component as well.

At the Museum, Tia downloads additional information on various exhibits into her phone using the museum WLAN. Some of her friends have downloaded info from different exhibits, and upon getting together they share data so that everyone has a full set. The Security component provides protection. For example, filters are set to firewall phone access. Downloaded data, particularly executable types, may be quarantined pending virus scanning. Scanning files may not be possible on the phone itself, but rather may require transfer to another machine. If Tia insists upon viewing or running a quarantined file before returning to home or school, the Security component may expedite scanning for that file over the cellular network depending on service settings and billing rules & limits.

At lunch, Jim uses his data phone and the restaurant WLAN to send & read messages, control his office PC so as to send requested files to colleagues, and to access his home network for personal tasks. The Security component provides needed protection so that these capabilities are safely enabled. Mediation via pre-arranged policy is provided so that an optimal balance of safety versus capability is obtained in all cases.

Martha meets a potential client for lunch, and with her laptop accesses the hotspot WLAN to access sites including her home business web site in order to present a proposal and conduct a demo while two of her partners (each at their own homes in different cities) participate in the discussion. Her Business Assistant provides reminders of important points she wanted to be certain to include. The potential client has a laptop as well, and Martha transfers certain files to that laptop upon request, while the Security component makes certain that her business-related wireless communications are protected. The Security component detects that certain files and communications as business related, and therefore sets up authenticated and encrypted tunnels to protect data transfers. Additionally, the DRM module of the Security component can enforce copyrights by limiting future sharing/copying of DRM'ed material. Note that the Security component would incorporate and direct a number of capabilities and mechanisms to protect "mobile" data.

Other family members similarly have lunch and use their phones and other devices to access network resources, access family network resources, synchronize application data, transfer messages and files, etc. In each case, the CS Security component performs appropriate mediation.

Tia is having lunch with her-class at a food court near the museum, and someone with access to the hot spot there is attempting to hack into her phone. The Security component detects a known attack type, estimates the potential severity of the attack and due to that severity exceeding a set threshold, it temporarily locks down her phone's communication feature, allowing only a secure tunnel, this tunnel is strongly authenticated & encrypted, meaning it is cryptographically secure, between her phone and the Security component itself until she moves to another location or a pre-set timer expires. The event is flagged with high priority and sent both to her father's phone (with a message that the problem is currently under control) and to a central CS service security response center. The response center keeps statistics on events such as this. Using special tools such as quick-reaction rapidly-configurable deception hosts and associated monitoring, it may initiate attempts to identify/locate & trap the culprit if possible; else it may work to inoculate all CS-enabled devices against this attack and its determinable variants. Additionally, the Security component downgrades the trust rating of Tia's phone until all its files and data have been thoroughly scanned and the integrity of its system files is suitably verified. Integrity can be verified via cryptographic hashing techniques wherein current hash results can be verified identical to previously calculated results (indicating that no changes to the files have been made).

Later that afternoon, Tom and Tia return home from school. Martha and Tia conduct a short conference with Tia's grandmother, who lives in another city. To view photos and together discuss a digital video of Tia's recent piano recital, they utilize the private portion of the family's external web site. The Security component recognizes identity credentials and allows access. The external web site may have both public and private portions (either one private portion, or multiple separated private portions). All access to the private portion is logged.

Unexpectedly, Tom finds his homework easy for a change, so he finishes it early and spends the rest of the time before dinner in an on-line collaborative gaming competition using premium-billed "turbo" (increased) bandwidth & premium QoS requested from and granted by the network, with the added cost being deducted from his weekly allowance. The Communications module can make the appropriate requests via network service APIs, and the Bill Payment component can either make immediate payment, if required, or tally & queue the payment for after-hours fulfillment. Allowances can be managed by Tom's father using an appropriate CS component such as the family's Planner. In order to accommodate the various additional protocols needed for this gaming service, the family firewall's policy is temporarily altered. The packet filter rule-set is altered to temporarily allow the extra protocol traffic to pass, even though this may lessen security slightly. The extra traffic is allowed to pass only to and from Tom's PC. Accordingly, the Security component's monitoring priority is slightly increased for the duration. Tom's PC, like most of the network-attached devices in the home (and particular each computer), is equipped with a Security component agent/client, which can provide some level of system monitoring, intrusion detection, and attack blocking, also reporting back to the Security component itself for more global oversight. The actions of this agent/client can be adjusted via changing the monitoring priority to different levels appropriate to the overall security situation. Depending on the service plan selected, which Jim and Martha can change on-line at any time, this may require additional payments. If additional payments are required, they can be charged to Jim's account or added to the amount deducted from Tom's allowance balance, depending on options selected by Jim and Martha (e.g., small surcharges may be deducted from allowances while surcharges over a settable threshold may be charged to the parents, with or without requiring verification).

The game requests some personal information, and although Tom should know better he inputs the data and sends it. However, the Absolute Privacy feature of the Security component recognizes the transmitted data, intercepts it, and strips the sensitive information from the transmission. Absolute Privacy consists of network-based monitoring & blocking of sensitive information. In this case, the transmitted data is detected as a close variant of information matching an entry in a list pre-configured by Tom's father. A pop-up notifies Tom, and a medium-priority message is sent to Jim. If Tom desires, he can immediately request an exception from his father by clicking on an option in the pop-up, but he realizes he made a mistake and closes the pop-up instead. The game operates satisfactorily anyhow, so Tom soon forgets about it (although his father does not).

Jim picks up take-out on the way home from work. He and Martha have scheduled many of these occasions in advance, with the Butler, Communicator, and Bill Paying components being directed by the Planner component to arrange, order, and pay for the food in advance. Reminded by the Butler, all Jim needs to do is swing by to pick up the food, briefly checking his phone to make sure the order is correct.

Megan has dinner with friends. Jason has a late lab session. Martha tells the Butler component to chime Tom and Tia, and the family gets together for dinner. The CS service can command their phones, or nearby network-attached devices, to alert them using different tones of pre-selectable meanings (in this case a "dinner is ready" chime), or alternately can use brief digitized voice messages.

At dinner, they discuss the events of the day, casually adding items in turn to the family task list and calendar. Some items are fully detailed whereas other items require further information to be added later. Later, the CS service will remind the appropriate family members to provide the missing information if necessary.

After dinner, Jim spends a half-hour doing some preliminary on-line research regarding a serious medical condition with which Martha's father was recently diagnosed. Not wanting to take any chances that this activity would be recorded or tracked in any way, he engages the Security component's Anonymity Guard so that no record of the medical sites he accesses can be traced to him or the family. The Anonymity Guard routes his traffic through a secure proxy gateway which removes all identifying information and utilized various additional complementary techniques to ensure that no one can identify Jim by his network activity. (The Anonymity Guard also contains a built-in CALEA capability to override anonymity when directed by court order). As he gathers information, he saves files to his personal encrypted Data Vault and copies web site links to a new private section of the family internal web site he configures to allow access to Martha as well as himself. The Data Vault can be set to allow access only to the authenticated owner, or additionally to other persons as well. All data is encrypted using (at least) the public key of the owner, such that only the owner's private key allows decryption. This private key is contained in his smartcard, and is enabled only via successful biometric authentication. The family's internal web site is an expandable reconfigurable intranet resource within the home, although access from outside the home can also be granted and coordinated via the Security component (with appropriate imposed policy). After more fully reviewing the information at a later date and discussing it with his wife, he may decide to utilize the Security component's Family VPN capability to arrange access for his father in-law as well. A Family VPN can be initiated between different homes when desired via the Security component and Communicator. (Jim has previously set up a semi-permanent Family VPN between the family home and Megan's apartment.)

As Jim adds links from his web browser to the private web site he just created, the Security component notices another program from Jim's PC attempting to access the Internet. The family firewall would normally allow the traffic to pass since the policy rule-set "allows" the corresponding protocol & port information typically visible to a firewall. However, the Security component is able to detect a discrepancy in the program name, in that the name claimed (and presented to the operating system on Jim's PC) is not the true name of the program. Although it has not yet been able to detect any sensitive information flowing, the Security component nevertheless flags the program traffic as dangerous so that the family firewall can block it. This is logged, and a small pop-up is activated on Jim's computer. Additionally, the Security component adds a deferred task to perform additional scanning and integrity verification on Jim's PC.

Subsequently, Jim and Tia access her School Page, provided by the Education component. Her teachers have inputted various information, files, documents, presentations, and web sites pertinent to the material they are currently covering into the CS system. The provider, possibly with the help of special partners (who pull in additional related material to enhance the learning experience), assembles and updates the CS School Pages for each customer so that the helpful information is always available and up-to-date. Tia has requested help with some new concepts presented in her math class, and Jim uses the information collected on the current material pages of the math section of her updated School Page to help improve her understanding. Jim scans the performance pages as well, and notes that Tia's recent quiz grades are decent but could certainly be improved, so he schedules recurring homework monitoring and help sessions with her for the next several weeks, and allows this information to be provided to her teacher so that she can be aware of their extra efforts. The School Page keeps track of a wide variety of information regarding each student's progress. This information can be viewed manually, or can be selected to be continually summarized and provided to the parents if they wish, such as when a student is having some problems. Alerts can be pre-set based on a variety of triggers (e.g., grades falling below a "B").

Martha sets up a conference with her two sisters after dinner, and they discuss their parents' upcoming 50th anniversary, making plans and coordinating tasks via their respective Planners. To keep the upcoming celebration a surprise, they use the Security component's Privacy Block feature to keep all related Calendar entries from showing up on their parents' Calendar, which they normally select to be auto-sync'ed such that it can maintain a view of each of their own Calendars. Privacy Block is used to maintain privacy via a variety of techniques depending on the circumstances. For example, it can be used to block others from seeing one or more stored items (individually selected to form a group, or set up as being related). It can also be set to obscure information in a number of ways. Additionally, it can provide deceptive information to others, depending on relative privilege & associated policy (although there are externally imposed limits on this).

Tom watches television content accumulated on the family DVR over the last several days according to his personal preferences, flipping between recorded shows, fast-forwarding past boring sections, and re-winding to see some scenes twice. As he watches, he casually selects associated web content to be bookmarked in his personal Video Page. The Video Page maintained by the Entertainment component for each viewer incorporates self-organizing features so that the viewer can keep links associated with various shows, actors, topics, and genres separate while being cross-related as appropriate. Another of the many internal web pages generated, managed, and made available by the CS service, the Video Page is closely integrated with the DVR-related (and other video-related) features of the Entertainment component.

Jason comes in late that night. His entry into the house is noted and authenticated by the Security component, and is subsequently chimed by the Butler to his parents (who are already in bed). Megan returns late to her apartment as well, as she decided to visit a club with her friends after their dinner. Often she telephones her mother in the evening, as they are very close, but the hour is too late for that, and for such occasions they have prearranged for the Butler to chime her return as well.

That night, the family members sleep while the CS continues to perform certain necessary operations standard security/functional verifications, and to any deferred special checks such as the in-depth scanning & integrity verification for Jim's PC tasked earlier. They remain unaware of the various checks and actions taking place, except for summary results recorded in the CS status log, which they may later view. The CS service Security component conducts after-hours data backups. The Physical Security Sub-module of the Security component monitors the physical security system of the family home and the wireless security system at Megan's apartment. The Communications component stores and prioritizes received messages, which are scanned for viruses by the Security component. Content is downloaded according to the preferences of various users and stored for later use, mediated and cryptographically locked by the DRM module of the Security component. Various additional modules of the Security component monitor the home for potential cyber-intrusions and check for data tampering, malware such as viruses, incursions of undesirable software such as spy-ware, etc. The Bill Payer component makes payments incurred during the day, such as for downloaded DRM'ed content that was actually listened to or viewed. Similarly, other CS components conduct off-hour functions as programmed. A set of changeable heuristic tests is externally applied to the various components to help ensure that they are functioning properly. Other verifications are based on cryptographic principles in conjunction with change logs, ensuring that the only changes made to key system elements are those which were proper and traceable to authorized log events (or hashes/digests).

If any problems are found, the service is designed so that the provider is generally able to diagnose and remedy the situation remotely. Only in rare cases might the family, or at least the parents, have to be alerted for safety's sake. Even then, the CS service is designed to be placed in whichever of several available "safe modes" is appropriate (until a complete restoration to proper functioning can be obtained).

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method for providing computing device executed application services to a user using a plurality of application service providing modules, each of which provides a subset of the application services to the user, the method comprising:

communicatively coupling a first computing device to a network comprising at least one other communicatively-coupled computing device;

receiving at the first computing device a request from a user;

automatically translating the request from the user to at least one need to be satisfied;

automatically identifying at least one of the plurality of application service providing modules executing on the at least one other computing device and required for satisfying the at least one need; and automatically scheduling execution of actions by the identified at least one of the plurality of application service providing modules executing on the at least one other computing device to satisfy the at least one need;

wherein identifying at least one of the plurality of application service providing modules comprises identifying at least two of the plurality of application service providing modules; and wherein the plurality of application service providing modules are each associated with a dynamic context, the dynamic context for an application service providing module being dependent on a condition of another of the application service providing modules that is not determinable based only on communications resulting from execution of the actions and wherein scheduling execution of actions by the identified application service providing modules to satisfy the at least one need comprises scheduling execution of actions by the identified application service providing modules to satisfy the at least one need based on a current condition of the dynamic context associated with the identified application service providing modules; and wherein the dynamic context includes a high level context and a low level context and wherein the high level context comprises a global context applicable to all of the plurality of application service providing modules and the low level context is applicable to an individual application service providing module.

2. The method of claim 1 wherein a plurality of user based preference/policies are provided and wherein the method further comprises identifying one of the plurality of user based preference/policies associated with the requesting user and wherein translating the request from the user to at least one need to be satisfied comprises translating the request from the user to at least one need to be satisfied based on the identified user based preference/policy.

3. The method of claim 1 wherein a plurality of user based preference/policies are provided and wherein the method further comprises identifying one of the plurality of user based preference/policies associated with the requesting user and wherein scheduling execution of actions by the identified application service providing modules to satisfy the at least one need comprises scheduling execution of actions by the identified application service providing modules to satisfy the at least one need based on the identified user based preference/policy.

4. The method of claim 1 wherein the respective subsets of the application services are grouped based on an anthropomorphic model of non-computing device based providers of corresponding services.

5. The method of claim 1 wherein a plurality of personality profiles are provided and wherein at least one of the application service providing modules is configured to incorporate a selected one of the plurality of personality profiles to provide an interface to the user having characteristics defined by the selected one of the personality profiles and wherein the method further comprises selecting one of the personality profiles responsive to a request from the user.

6. The method of claim 1 wherein ones of the plurality of application service providing modules are associated with one or more groups and wherein the dynamic context further includes an intermediate level context and wherein the dynamic context for a particular application service providing module includes at least one intermediate level context wherein each intermediate level context is based on a group with which the particular application service providing module is associated.

7. The method of claim 1 wherein the dynamic context for at least one of the context levels includes an operational context associated with conditions related to performance of the application service providing modules and a security context associated with security threats to providing the computing device executed application services to the user and/or to providing maintenance and support functions.

8. The method of claim 1 further comprising communicating dynamic context information between ones of the plurality of application service providing modules, infrastructure modules and/or interface modules to advise the application service providing modules, infrastructure modules and/or interface modules of low level context of other of the modules.

9. The method of claim 8 wherein an application service providing module maintains its dynamic context as a master context record including a plurality of context units and wherein communicating dynamic context information comprises communicating selected ones of the context units.

10. The method of claim 9 wherein the master context has a predefined ordering of context units and wherein a master context for a particular application service provider module includes only a subset of all possible context units maintained in an ordered sequence corresponding to an archetypal master context including all possible context units.

11. The method of claim 10 wherein the possible context units include security alert level, latency, error conditions, execution hold conditions, trust level and/or security attack in progress indications and wherein at least one of the possible context units comprises a plurality of context units associated with different context levels.

12. The method of claim 1 wherein a security module is communicatively coupled to the plurality of application service providing modules, infrastructure modules and/or interface modules and wherein the method further comprises:
   receiving at the security module security context information from ones of the plurality of application service providing modules, infrastructure modules and/or interface modules;
   defining a security level global context based on the received security context information; and
   communicating the security level global context to the plurality of application service providing modules, infrastructure modules and/or interface modules.

13. The method of claim 12 further comprising periodically communicating dynamic context information to the security module and verifying at the security module that the communicated dynamic context information from the application service providing modules, infrastructure modules and/or interface modules is up to date.

14. The method of claim 12 further comprising:
   defining an interlocked state machine model for the plurality of application service providing modules for the at least one need to be satisfied;
   monitoring execution of the actions by the application service providing modules based on the interlocked state machine model; and
   detecting a security event based on the monitored execution of the actions.

15. The method of claim 14 further comprising dynamically restricting communications in-progress between ones of the application service providing modules based on the detected security event.

16. The method of claim 15 wherein the interlocked state machine model is based on the dynamic context and wherein the application service providing modules are visible to the user and wherein an interface module that is not visible to the user communicatively couples the application service providing modules and wherein dynamically restricting communications in-progress comprises dynamically restricting the communications at the interface module based on the interlocked state machine model.

17. The method of claim 1 wherein scheduling execution of the actions includes generating a needs list using a composer module, not visible to the user, and identifying the actions based on the generated needs list and communicating ones of the identified actions to associated ones of the application service providing modules for execution using a conductor module, not visible to the user.

18. The method of claim 17 wherein the identified actions comprise baseline actions with modification options designated by the conductor module that modify the actions to be executed by the application service providing modules.

19. The method of claim 18 further comprising, the following carried out by receiving ones of the application service providing modules:
   expanding received ones of the communicated identified actions into transactions executable by the receiving application service providing module; and executing the transactions.

20. The method of claim 1 further comprising:
receiving at an automation module information regarding user requests and needs;
predicting future needs for the user based on processing rules for the user;
receiving a potential needs trigger notification from one of the application service providing modules;
comparing the received potential needs trigger to the predicted future needs; and
scheduling execution of the predicted future needs when they correspond to the received potential trigger.

21. The method of claim 20 wherein scheduling execution of the predicted future needs includes obtaining a request from the user authorizing execution of the predicted future needs.

22. The method of claim 20 wherein predicting future needs for the user based on processing rules for the user further comprises formatting the predicted future needs based on a selected one of a plurality of available needs handling models.

23. The method of claim 1, further comprising:
communicating an integrated security model for the provision of application services to the plurality of application service providing modules to define an integrated security model; and
controlling operations of the plurality of application service providing modules based on the integrated security model.

24. A system including at least one processor for providing computing device executed application services to a user using a plurality of application service providing modules, each of which provides a subset of the application services to the user, the at least one processor configured to:
communicatively couple a first computing device including the at least one processor to a network comprising at least one other communicatively-coupled computing device;
receive at the first computing device a request from a user;
automatically translate the request from the user to at least one need to be satisfied;
automatically identify at least one of the plurality of application service providing modules executing on the at least one other computing device and required for satisfying the at least one need; and
automatically schedule execution of actions by the identified at least one of the plurality of application service providing modules executing on the at least one other computing device to satisfy the at least one need;
wherein identifying at least one of the plurality of application service providing modules comprises identifying at least two of the plurality of application service providing modules; and
wherein the plurality of application service providing modules are each associated with a dynamic context, the dynamic context for an application service providing module being dependent on a condition of another of the application service providing modules that is not determinable based only on communications resulting from execution of the actions and wherein scheduling execution of actions by the identified application service providing modules to satisfy the at least one need comprises scheduling execution of actions by the identified application service providing modules to satisfy the at least one need based on a current condition of the dynamic context associated with the identified application service providing modules; and
wherein the dynamic context includes a high level context and a low level context and wherein the high level context comprises a global context applicable to all of the plurality of application service providing modules and the low level context is applicable to an individual application service providing module.

25. The system of claim 24 further comprising a security module communicatively coupled to the plurality of application service providing modules configured to receive security context information from ones of the plurality of application service providing modules, define a security level global context based on the received security context information and communicate the security level global context to the plurality of application service providing modules.

26. The system of claim 25 wherein the application service providing modules are visible to the users and wherein the system further comprises an interface module that is not visible to the user that communicatively couples the application service providing modules and dynamically restricts communications in-progress responsive to the security module.

27. The system of claim 25 further comprising an automation module configured to receive information regarding user requests and needs and predict future needs for the user based on processing rules for the user.

28. A computer program product that is configured to provide computing device executed application services to a user using a plurality of application service providing modules, each of which provides a subset of the application services to the user, the computer program product comprising a computer usable storage medium having computer-readable program code embodied in the medium, the computer-readable program code comprising:
computer-readable program code that is configured to receive a request from a user;
computer-readable program code that is configured to automatically translate the request from the user to at least one need to be satisfied;
computer-readable program code that is configured to automatically identify at least one of the plurality of application service providing modules required for satisfying the at least one need; and
computer-readable program code that is configured to automatically schedule execution of actions by the identified at least one of the plurality of application service providing modules to satisfy the at least one need;
wherein the computer-readable program code that is configured to identify at least one of the plurality of application service providing modules is further configured to identify at least two of the plurality of application service providing modules; and
wherein the plurality of application service providing modules are each associated with a dynamic context, the dynamic context for an application service providing module being dependent on a condition of another of the application service providing modules that is not determinable based only on communications resulting from execution of the actions and wherein the computer-readable program code that is configured to schedule execution of actions by the identified application service providing modules to satisfy the at least one need is further configured to schedule execution of actions by the identified application service providing modules to satisfy the at least one need based on a current condition of the dynamic context associated with the identified application service providing modules; and wherein the dynamic context includes a high level context and a low level context and wherein the high level context comprises a global context applicable to all of the plurality of application service providing modules and the low level context is applicable to an individual application service providing module.

* * * * *